(12) United States Patent
Fujisawa

(10) Patent No.: US 12,019,409 B2
(45) Date of Patent: Jun. 25, 2024

(54) RADIO-CONTROLLED TIMEPIECE, SYSTEM, AND METHOD FOR CONTROLLING RADIO-CONTROLLED TIMEPIECE

(71) Applicant: Seiko Epson Corporation, Toyko (JP)

(72) Inventor: Teruhiko Fujisawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 709 days.

(21) Appl. No.: 17/168,239

(22) Filed: Feb. 5, 2021

(65) Prior Publication Data
US 2021/0247724 A1    Aug. 12, 2021

(30) Foreign Application Priority Data

Feb. 6, 2020 (JP) ................. 2020-018475

(51) Int. Cl.
*G04R 20/28* (2013.01)
*G04G 19/00* (2006.01)
(Continued)

(52) U.S. Cl.
CPC ............. *G04R 20/28* (2013.01); *G04G 19/00* (2013.01); *H04W 4/80* (2018.02); *H04W 8/22* (2013.01); *G04R 20/04* (2013.01)

(58) Field of Classification Search
CPC ........ G04R 20/28; G04R 20/04; G04G 19/00; H04W 4/80; H04W 8/22
See application file for complete search history.

(56) References Cited

U.S. PATENT DOCUMENTS 7,983,116 B2 * 7/2011 Fujisawa ................. G01S 19/14
                                                  368/46
9,581,975 B2 * 2/2017 Fujisawa .......... G01R 19/16542
(Continued)

FOREIGN PATENT DOCUMENTS

JP    2002-328190 A    11/2002
JP    2009-168620 A     7/2009
(Continued)

OTHER PUBLICATIONS

Liu and Striegel, "Accurate Extraction of Face-to-Face Proximity Using Smartphones and Bluetooth", Jul. 2011, IEEE Xplore (Year: 2011).*

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A radio-controlled timepiece includes a receiver configured to receive satellite radio waves including first time information, a short-range receiver configured to receive radio waves including second time information transmitted from a mobile device, an operating device configured to accept instruction operation, a reception controller configured to selectively execute first reception processing of acquiring the first time information by operating the receiver at a preset time and second reception processing of acquiring the second time information by operating the short-range radio receiver in response to the instruction operation from the operating device, and a time correction controller configured to correct a display time based on the first time information acquired in the first reception processing or the second time information acquired in the second reception processing.

8 Claims, 11 Drawing Sheets

(51) Int. Cl.
*H04W 4/80* (2018.01)
*H04W 8/22* (2009.01)
*G04R 20/04* (2013.01)

(56) References Cited

U.S. PATENT DOCUMENTS

| | | | |
|---|---|---|---|
| 9,952,561 B2* | 4/2018 | Sekitsuka | G04R 20/06 |
| 11,567,458 B2* | 1/2023 | Fujisawa | G04R 20/10 |
| 2009/0180356 A1 | 7/2009 | Fujisawa | |
| 2014/0273858 A1* | 9/2014 | Panther | A61B 5/4812 |
| | | | 455/41.2 |
| 2016/0223994 A1 | 8/2016 | Honda | |
| 2016/0227600 A1* | 8/2016 | Shedletsky | H04M 1/72463 |
| 2017/0277141 A1* | 9/2017 | Sekitsuka | G04R 20/10 |
| 2018/0129169 A1* | 5/2018 | Fujisawa | G04G 21/04 |
| 2018/0173168 A1* | 6/2018 | Hasegawa | G04R 20/26 |
| 2018/0275613 A1* | 9/2018 | Ukawa | G04G 21/02 |

FOREIGN PATENT DOCUMENTS

| | | |
|---|---|---|
| JP | 2015-143630 A | 8/2015 |
| JP | 2016-142576 A | 8/2016 |
| JP | 2018-159666 A | 10/2018 |
| JP | 2018-179872 A | 11/2018 |
| JP | 2019-124641 A | 7/2019 |
| JP | 2019-148441 A | 9/2019 |

* cited by examiner

RADIO-CONTROLLED TIMEPIECE, SYSTEM, AND METHOD FOR CONTROLLING RADIO-CONTROLLED TIMEPIECE

The present application is based on, and claims priority from JP Application Serial Number 2020-018475, filed Feb. 6, 2020, the disclosure of which is hereby incorporated by reference herein in its entirety.

BACKGROUND

1. Technical Field

The present disclosure relates to a radio-controlled timepiece, a system, and a method for controlling the radio-controlled timepiece.

2. Related Art

JP-A-2009-168620 discloses an electronic timepiece that receives a satellite signal from a position information satellite such as a Global Positioning System (GPS) to correct the time.

JP-A-2002-328190 discloses an electronic timepiece that acquires information from a nearby device and corrects the time by performing short-range wireless communication with the nearby device using BLUETOOTH®, a near-range wireless communication.

The electronic timepiece disclosed in JP-A-2009-168620 cannot correct the time in an environment such as inside a building where satellite signals cannot be received. For this reason, when an airplane travels over a time difference and arrives at the airport, the electronic timepiece cannot receive satellite signals inside the airport building and cannot correct the time. Thus, the electronic timepiece cannot correct the time zone while in the airport building and cannot immediately correct the time to the local time.

On the other hand, in the electronic timepiece disclosed in JP-A-2002-328190, when the short-range wireless communication is performed between, for example, a smartphone and the electronic timepiece, it is necessary to activate an application of the smartphone for communicating with the electronic timepiece, which is complicated for the user.

SUMMARY

A radio-controlled timepiece of the present disclosure includes a receiver configured to receive satellite radio waves including first time information, a short-range receiver configured to receive radio waves including second time information transmitted from a mobile device, an operating device configured to accept instruction operation, a reception controller configured to selectively execute first reception processing acquiring the first time information by operating the receiver at a preset time and second reception processing of acquiring the second time information by operating the short-range radio receiver in response to the instruction operation from the operating device, and a time correction controller configured to correct a display time based on the first time information acquired in the first reception processing or the second time information acquired in the second reception processing.

A system of the present disclosure includes the radio-controlled timepiece and the mobile device, in which the mobile device includes a second operating device, is set, by operation of the second operating device, to a communication prohibition mode in which communication with another device is prohibited and starts a function of communicating with the radio-controlled timepiece when the communication prohibition mode is canceled by operation of the second operating device.

A method for controlling a radio-controlled timepiece of the present disclosure is a control method for the radio-controlled timepiece including a receiver configured to receive satellite radio waves including first time information, a short-range receiver configured to receive radio waves including second time information transmitted from a mobile device, and an operating device configured to accept instruction operation. In the method, first reception processing by the receiver is executed at a preset time, second reception processing by the short-range receiver is executed in response to the instruction operation from the operating device, and a display time is corrected based on the first time information acquired in the first reception processing or the second time information acquired in the second reception processing.

DESCRIPTION OF EXEMPLARY EMBODIMENTS

First Embodiment

Figure 1:
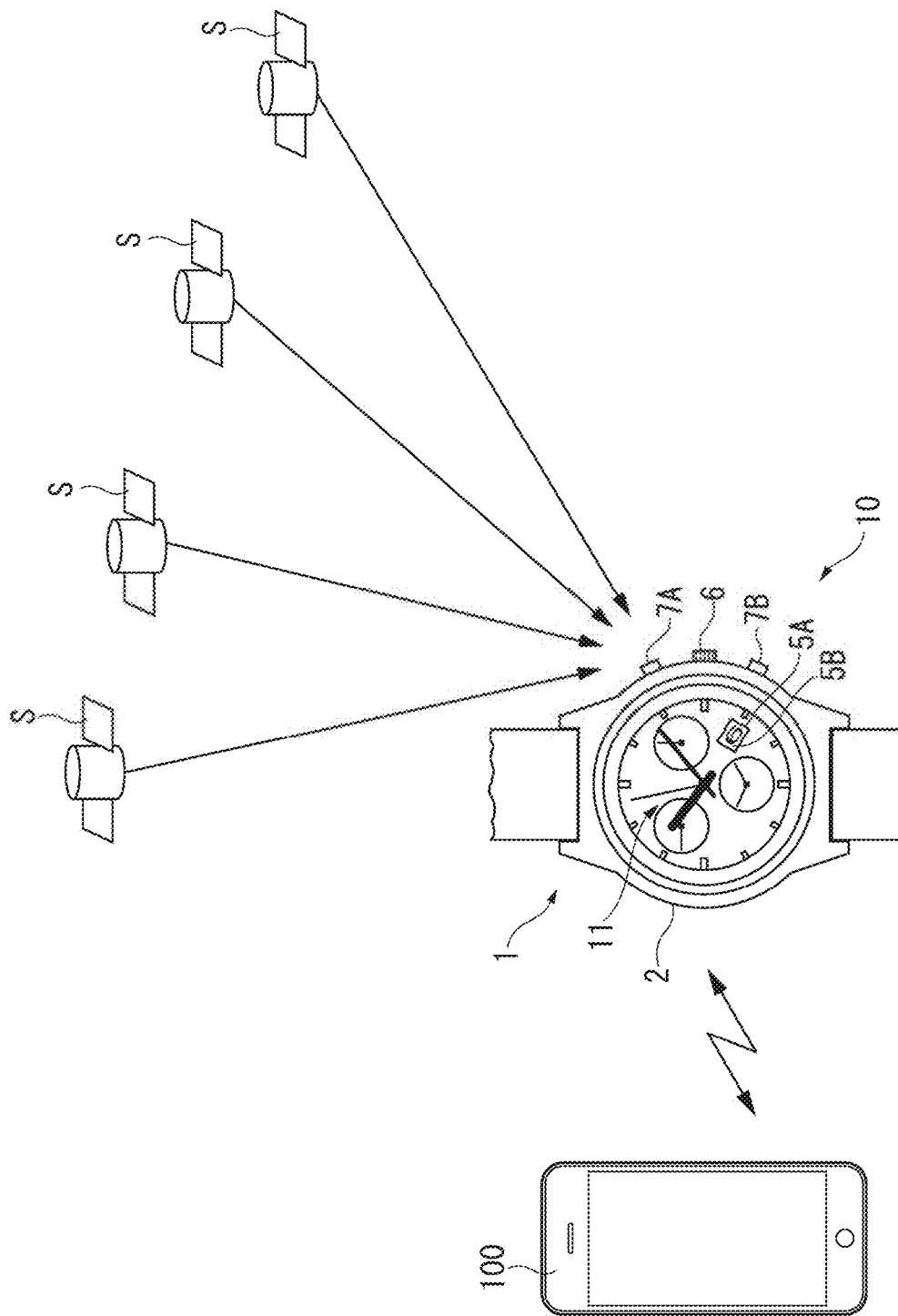
FIG. 1 is a diagram illustrating a system including a radio-controlled timepiece and a mobile device according to a first embodiment.

FIG. 1 is a diagram illustrating a configuration of a system 10 according to an exemplary embodiment. The system 10 includes a radio-controlled timepiece 1 and a mobile device 100. The mobile device 100 is a smartphone, a tablet, a mobile personal computer, or the like, and is configured to communicate with a server (not illustrated) or the like via a base station constituting a network such as a mobile communication network or a public wireless local area network (LAN) and an Internet network. Since the mobile device 100 can acquire time information via the mobile communication network or the like, the mobile device 100 can automatically display the time according to the time at the current location.

Radio-Controlled Timepiece

As illustrated in FIG. 1, the radio-controlled timepiece 1 of the exemplary embodiment is configured to acquire satellite time information by receiving satellite signals from position information satellites S such as a plurality of GPS satellites and quasi-zenith satellites that orbit the earth in their respective predetermined orbits, and correct the display time. Further, the radio-controlled timepiece 1 includes a solar cell panel as a power generation device, and includes a secondary battery for storing power generated by the solar cell panel.

Accordingly, the radio-controlled timepiece 1 has a solar function of converting light energy such as sunlight into electrical energy, and a satellite radio wave correction function of displaying the current location time based on a satellite signal received from the position information satellite.

Note that, since the generated voltage of the solar cell panel fluctuates in accordance with the irradiated light energy, the solar cell panel can also be used as an optical sensor for detecting whether the amount of emitted light is equal to or higher than a threshold level.

Figure 2:
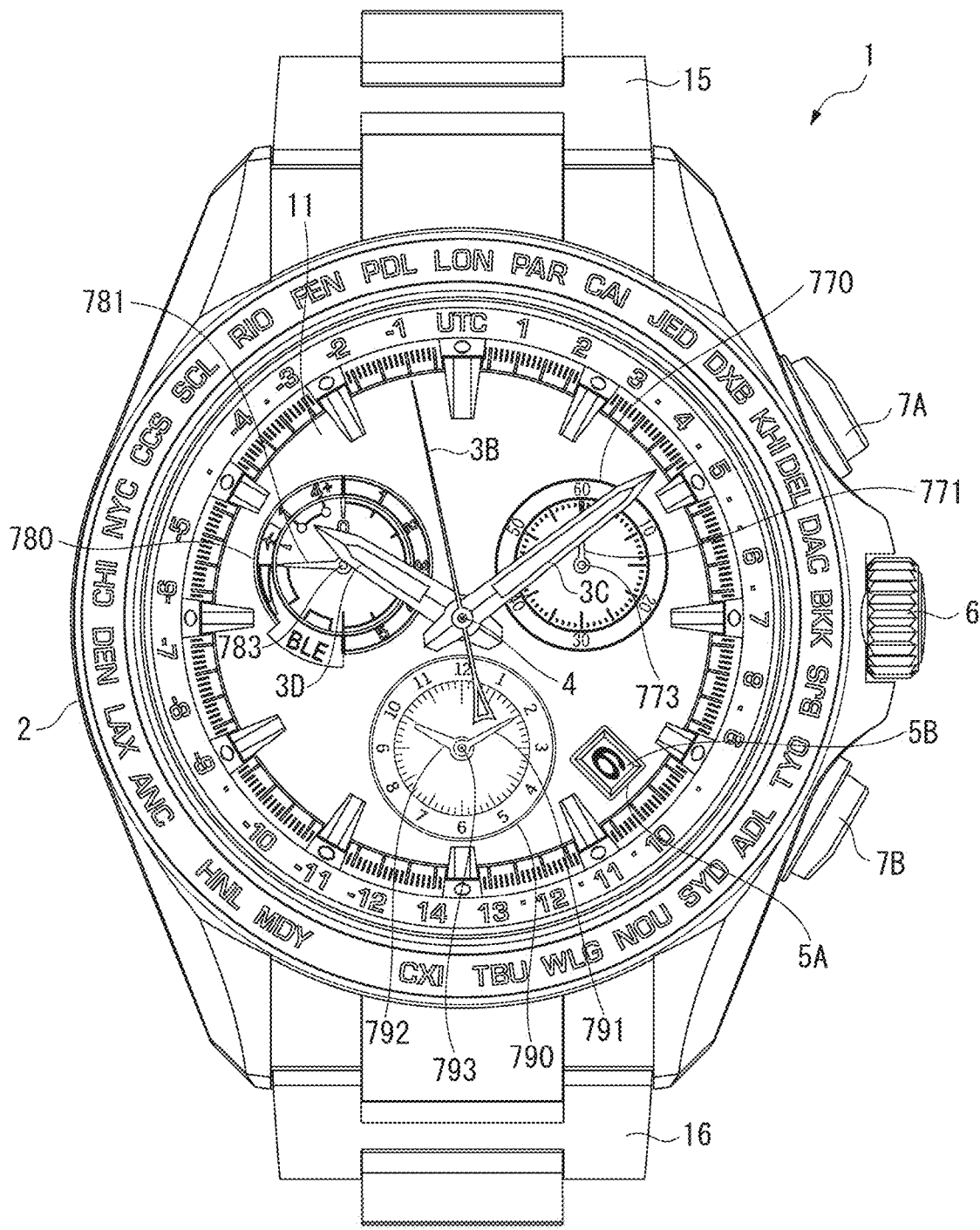
FIG. 2 is a front view illustrating the radio-controlled timepiece.
Figure 3:
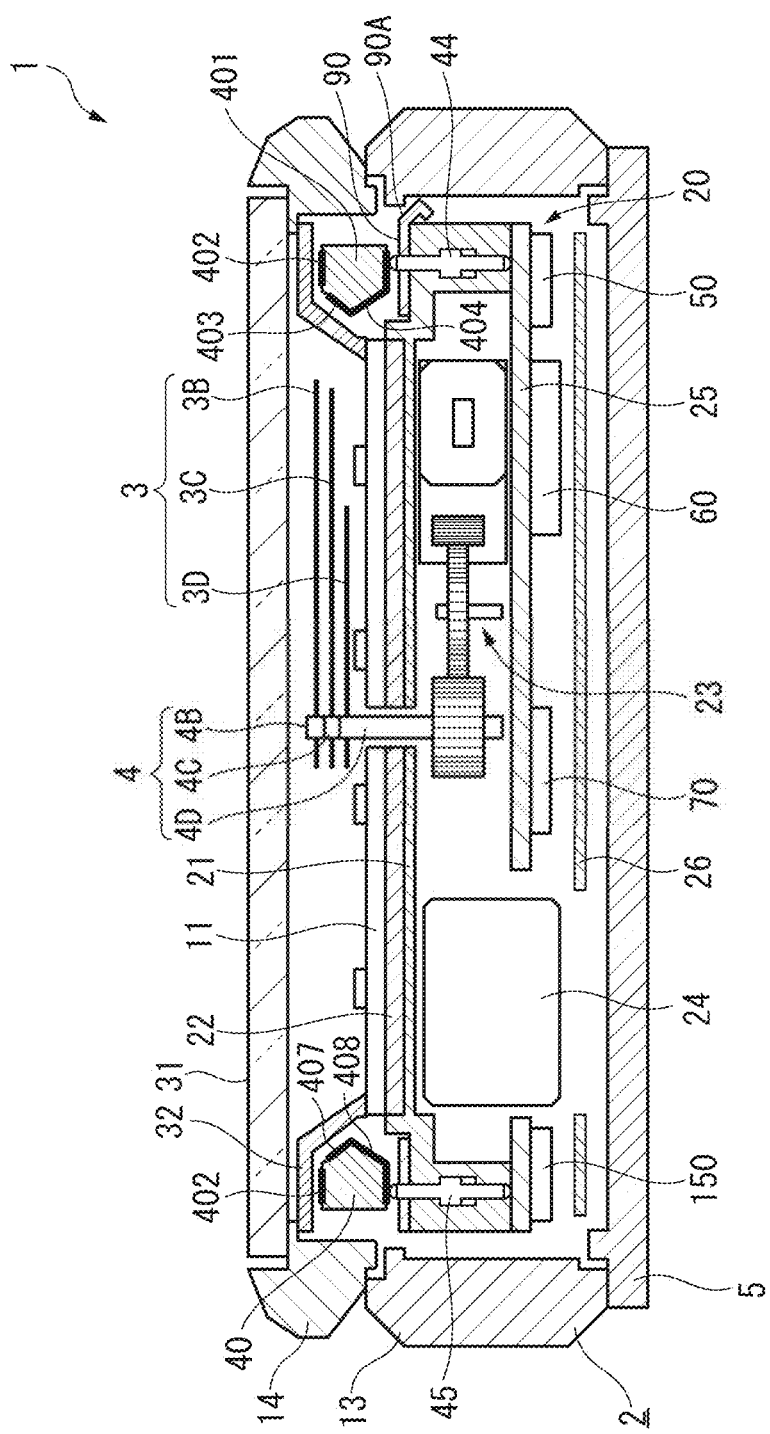
FIG. 3 is a cross-sectional view illustrating the radio-controlled timepiece.

As illustrated in FIGS. 2 and 3, the radio-controlled timepiece 1 includes a dial 11 and an outer case 2. The outer case 2 includes a case body 13 formed in a substantially cylindrical shape, a ring-shaped bezel 14 fixed to the front surface side of the case body 13, a cover glass 31 fixed to the bezel 14, and a case back 5 fixed to the back surface side of the case body 13.

Note that, in the exemplary embodiment, the case body 13 and the case back 5 are configured as separate bodies, but the present disclosure is not limited thereto, and a one-piece case in which the case body 13 and the case back 5 are integrated may be used.

Further, in the following description, viewing the radio-controlled timepiece 1 from a direction orthogonal to the surface of the dial 11 is referred as a plan view.

As illustrated in FIG. 2, the radio-controlled timepiece 1 is provided with an A button 7A at a position in the 2 o'clock direction, a B button 7B at a position in the 4 o'clock direction, and a crown 6 at a position in the 3 o'clock direction from the center of a flat surface of the dial 11. By operating the A button 7A, the B button 7B, or the crown 6, an operation signal in accordance with the operation is outputted. Accordingly, the A button 7A, the B button 7B, and the crown 6 are included in an operating device that accepts the user's operation in the radio-controlled timepiece 1.

A first strap 15 is coupled to the 12 o'clock side of the outer case 2, a second strap 16 is coupled to the six o'clock side, and the first strap 15 and the second strap 16 are coupled by a clasp (not illustrated). Each of the first strap 15 and the second strap 16 is a strap including an end-piece which is made of metal such as titanium and attached to the outer case 2, and a plurality of blocks. Note that the strap is not limited to the metal strap, and may be a leather strap, a resin strap, or the like.

The dial 11 is made of a non-conductive material such as polycarbonate and is formed in a disc shape. As illustrated in FIG. 2, a hand arbor 4 provided to pass through the dial 11 is disposed at the center of the flat surface of the dial 11. As illustrated in FIG. 3, the hand arbor 4 includes a second hand arbor 4B, a minute hand arbor 4C, and an hour hand arbor 4D, and a second hand 3B, a minute hand 3C, and an hour hand 3D, which constitute a hand 3 for displaying the current time, are attached to the respective arbors. A dial ring 32 is disposed on an outer peripheral portion of the dial 11.

As illustrated in FIG. 2, the radio-controlled timepiece 1 is a multifunctional timepiece including three small windows (sub dials) 770, 780, and 790, hand arbors 773, 783, and 793, and hands 771, 781, and 791 and 792 attached to the respective hand arbors 773, 783, and 793.

The first small window 770 is provided in the 2 o'clock direction with respect to the center of the flat surface of the dial 11. The second small window 780 is provided in the 10 o'clock direction with respect to the center of the flat surface of the dial 11. The third small window 790 is provided in the 6 o'clock direction with respect to the center of the flat surface of the dial 11.

The dial 11 is provided with a rectangular date window 5A in a direction between 4 o'clock and 5 o'clock with respect to the center of the flat surface of the dial 11. A date indicator 5B is disposed on the back surface side of the dial 11, and the date indicator 5B is visible through the date window 5A.

In the exemplary embodiment, the hand 771 in the first small window 770 is a hand of a chronograph 60-minute counter. The hand 781 in the second small window 780 serves as both a mode hand for pointing various kinds of information and a chronograph hour hand. The hands 791 and 792 in the third small window 790 are minute and hour hands for a small timepiece that point home time or local time.

The second hand 3B, the minute hand 3C, the hour hand 3D, the hands 771, 781, 791, and 792, and the date indicator 5B described above are driven via a motor and a train wheel (not illustrated).

In the second small window 780 pointed by the hand 781, which is a mode hand, a power reserve indicator indicating a remaining amount of the secondary battery 24, an indicator indicating a setting of each mode of an in-flight mode, a GPS satellite signal reception mode, and the short-range wireless communication mode, and an indicator indicating the chronograph hour are displayed.

The power indicator displays the remaining amount of the secondary battery 24 in a band shape from the 9 o'clock position to approximately the 8 o'clock position of the second small window 780, and the 9 o'clock position means full (F) and the 8 o'clock position means empty (E). That is, when the battery voltage of the secondary battery 24 is equal to or higher than a first threshold, the hand 781 points F to indicate that the charge amount is sufficient, and when the battery voltage is lower than a second threshold, which is lower than the first threshold, the hand 781 points E to indicate that the charge amount is insufficient. When the battery voltage is a certain value that is equal to or higher than the second threshold and lower than the first threshold, the hand 781 points between F and E to indicate that the charge amount has decreased.

An airplane mark indicating the in-flight mode is displayed at approximately 9.5 o'clock in the second small window 780. The in-flight mode is an example of an automatic reception prohibition mode in which an automatic reception processing is not started even when the automatic reception condition is satisfied, as described later.

"1" indicating the time measurement mode of the reception mode is displayed at the approximately 10 o'clock position, and "4+" indicating the positioning mode is displayed at the approximately 11 o'clock position.

The symbol "BLE" indicating the short-range wireless communication mode is displayed from the 6 o'clock position to the approximately 8 o'clock position in the second small window 780.

As the indicator for indicating the chronograph hour, an indicator for 6 hours is set from the 12 o'clock position to the 6 o'clock position via the 3 o'clock position in the second small window 780.

Internal Structure of Radio-controlled Timepiece

Next, an internal structure built in the outer case 2 of the radio-controlled timepiece 1 will be described.

FIG. 3 is a cross-sectional view of a main part of the radio-controlled timepiece 1. As illustrated in FIG. 3, the cylindrical bezel 14 is fitted on the upper side (front surface side) of the cylindrical case body 13, and the opening on the upper side of the bezel 14 is closed with a disc-shaped cover glass 31. Further, the opening on the lower side (rear surface side) of the case body 13 is closed with the case back 5. The case body 13 and the case back 5 are fixed by, for example, a screw groove. The outer case 2 of the radio-controlled timepiece 1 is constituted by, for example, the case body 13, the bezel 14, the cover glass 31, and the case back 5.

The case body 13, which serves as a main body of the outer case 2, the case back 5, and the bezel 14 are made of metal such as stainless steel, titanium, aluminum, or brass. Note that the bezel 14 may be made of ceramic such as zirconia ($ZeO_2$), titanium carbide (TiC), titanium nitride (TiN), or alumina ($Al_2O_3$). Since radio waves pass through the ceramic, the ceramic bezel 14 improves the wireless communication performance. Further, the ceramic has the advantages of being hard, having excellent scratch resistance, and maintaining its aesthetic appearance for a long period of time.

The dial ring 32, a movement 20, a ring antenna 40, and the like are accommodated in the outer case 2 in addition to the dial 11.

The movement 20 includes a main plate 21, a solar cell panel 22, a drive mechanism 23, the secondary battery 24, a printed wired board 25, a circuit cover 26, and the like.

The dial ring 32 is formed in an annular shape and is disposed below the cover glass 31 and along an inner circumference of the bezel 14. The outer peripheral side of the dial ring 32 is a planar portion that contacts the bezel 14, and the inner peripheral side is an inclined portion that is inclined inward. A donut-shaped storage space is provided under the dial ring 32, and the annular ring antenna 40 is stored in this storage space. The ring antenna 40 is disposed around the dial 11. Specifically, the ring antenna 40 is disposed inside the inner circumference of the case body 13 and the bezel 14, and the upper portion thereof is covered with the dial ring 32.

An annular ground plate 90 formed of a conductive material such as metal is provided on the lower side of the ring antenna 40. Insertion holes are formed in the ground plate 90 and the main plate 21, and feed pins 44 and 45 are inserted therethrough.

Further, an insertion hole is formed in the main plate 21, and a conductive pin (not illustrated) for supplying a ground potential to the ground plate 90 is inserted. At least one, for example, four conductive pins, are provided and are in contact with the ground plate 90. Thus, the potential of the ground plate 90 is maintained at the ground potential. Further, the ground plate 90 includes a plurality of conductive springs 90A that come in contact with the inner peripheral surface of the case body 13. Therefore, the potential of the case body 13 is maintained at the same potential as the ground plate 90, that is, the ground potential.

The dial 11 and the solar cell panel 22 are provided inside the ring antenna 40. The dial 11 is formed of a light-transmissive non-conductive material such as plastic. Further, the solar cell panel 22 is a circular flat plate in which a plurality of solar cells that convert light energy into electrical energy are coupled in series. The dial 11 and the solar cell panel 22 are disposed so as to be overlapped with each other, and holes through which the hand arbors 4, 773, 783, and 793 pass are provided, respectively.

The main plate 21 formed of a non-conductive material such as plastic or ceramic is provided on the lower side of the solar cell panel 22.

As illustrated in FIG. 3, the drive mechanism 23 for rotating the hand arbor 4 and the like to drive the hand 3 is provided on the lower side of the main plate 21. The drive mechanism 23 includes a step motor and a train wheel of gears or the like, and the step motor drives the hand 3 by rotating the hand arbor 4 via the train wheel. Note that the step motor and the train wheel are appropriately set in the movement 20.

For example, the movement 20 of the exemplary embodiment is provided with six step motors, that is, a second motor for the second hand 3B, an hour/minute motor for the minute hand 3C and the hour hand 3D, a date indicator motor for the date indicator 5B, a chronograph minute motor for the hand 771, a motor for both the mode and the chronograph hour for the hand 781, and a motor for the small timepiece for the hands 791 and 792.

The printed wired board 25 is provided below the main plate 21 and the drive mechanism 23. Circuit blocks including a GPS receiving module 50, a control display module 60, a power supply module 70, and a short-range wireless communication module 150 are mounted on a lower surface (rear side surface) of the printed wired board 25. Each of the modules 50, 60, 70, and 150 is constituted by, for example, a one-chip IC module, and includes an analog circuit and a digital circuit. Details of the respective modules 50, 60, 70, and 150 are described later.

Ring Antenna

Next, the structure of the ring antenna 40 will be described.

The ring antenna 40 includes both a 1.5 GHz electrode pattern for GPS reception and a 2.4 GHz electrode pattern for BLE communication. Specifically, the ring antenna 40 includes an annular base member 401 formed of a dielectric material such as plastic or ceramic, and on surfaces of the base member 401, includes a parasitic element 402, conductive feed elements 403 and 407 to which a predetermined electric potential is supplied, and connecting portions 404 and 408.

The central axis of the annular base member 401 and the central axis of the annular ground plate 90 are the same, and this common central axis coincides with the hand arbor 4. The spacing between the base member 401 and the ground plate 90 is set so that radio waves can be received by causing resonance between the ground plate 90 and the feed element 403 provided on the base member 401.

The parasitic element 402, the feed elements 403 and 407, and the connecting portions 404 and 408 are all formed of a conductive material such as metal, and can be formed by, for example, plating or silver paste printing. The material of the base member 401 is adjusted so that the relative permittivity is approximately 5 to 20 by mixing a dielectric material such as titanium oxide that can be used at high frequencies with the resin. In addition, the cross section of the base member 401 is pentagonal. That is, the base member 401 includes an outer peripheral surface along an inner peripheral surface of the bezel 14, an upper surface continuous with an upper end of the outer peripheral surface, that is, the end portion on the dial ring 32 side, a bottom surface continuous with a lower end of the outer peripheral surface, that is, the end portion on the ground plate 90 side, a first inclined surface that is continuous with the inner peripheral end of the upper surface and is inclined toward the main plate 21 side, and a second inclined surface provided between the first inclined surface and the bottom surface.

The parasitic element 402 is formed on the upper surface of the base member 401, and the feed elements 403 and 407 are formed on the first inclined surface of the base member 401. Further, the connecting portions 404 and 408 are formed across the second inclined surface and the bottom surface, and is electrically connect to the feed elements 403 and 407 and the feed pins 44 and 45. Thus, the connecting portions 404 and 408 are formed corresponding to the positions where the supply pins 44 and 45 are disposed, and the predetermined electric potential is supplied to the feed elements 403 and 407 via the feed pins 44 and 45 and the connecting portions 404 and 408.

On the other hand, no potential is supplied to the parasitic element 402 from the outside.

The parasitic element 402 is formed in an annular shape along the upper surface of the base member 401. On the other hand, the feed elements 403 and 407 are formed in a substantially semicircular shape in plan view, respectively.

The feed element 403 is an electrode pattern for receiving GPS, and has an antenna length that resonates with a satellite signal of 1.5 GHz transmitted from the GPS satellite.

The feed element 407 is an electrode pattern for BLE communication, and has an antenna length that resonates with a radio wave of 2.4 GHz for short-range wireless communication.

These feed elements 403 and 407 are formed at positions that do not overlap with each other in plan view. For example, the feed element 403 may be formed along a range from 4 o'clock to 8 o'clock via 6 o'clock on the dial 11 and the feed element 407 may be formed along a range from 10 o'clock to 2 o'clock via 12 o'clock on the dial 11. The connecting portion 404 may be formed within the range in which the feed element 403 is formed, for example, at the 6 o'clock position, and the connecting portion 408 may be formed within the range in which the feed element 407 is formed, for example, at the 12 o'clock position.

The parasitic element 402 is provided apart from the feed elements 403 and 407, and is set so that when a current flows through any of the feed elements 403 and 407, a current is also induced in the parasitic element 402. Accordingly, the feed elements 403 or 407 and the parasitic element 402 together function as an antenna element that converts an electromagnetic wave into an electric current.

Circuit Configuration of Radio-Controlled Timepiece

Figure 4:
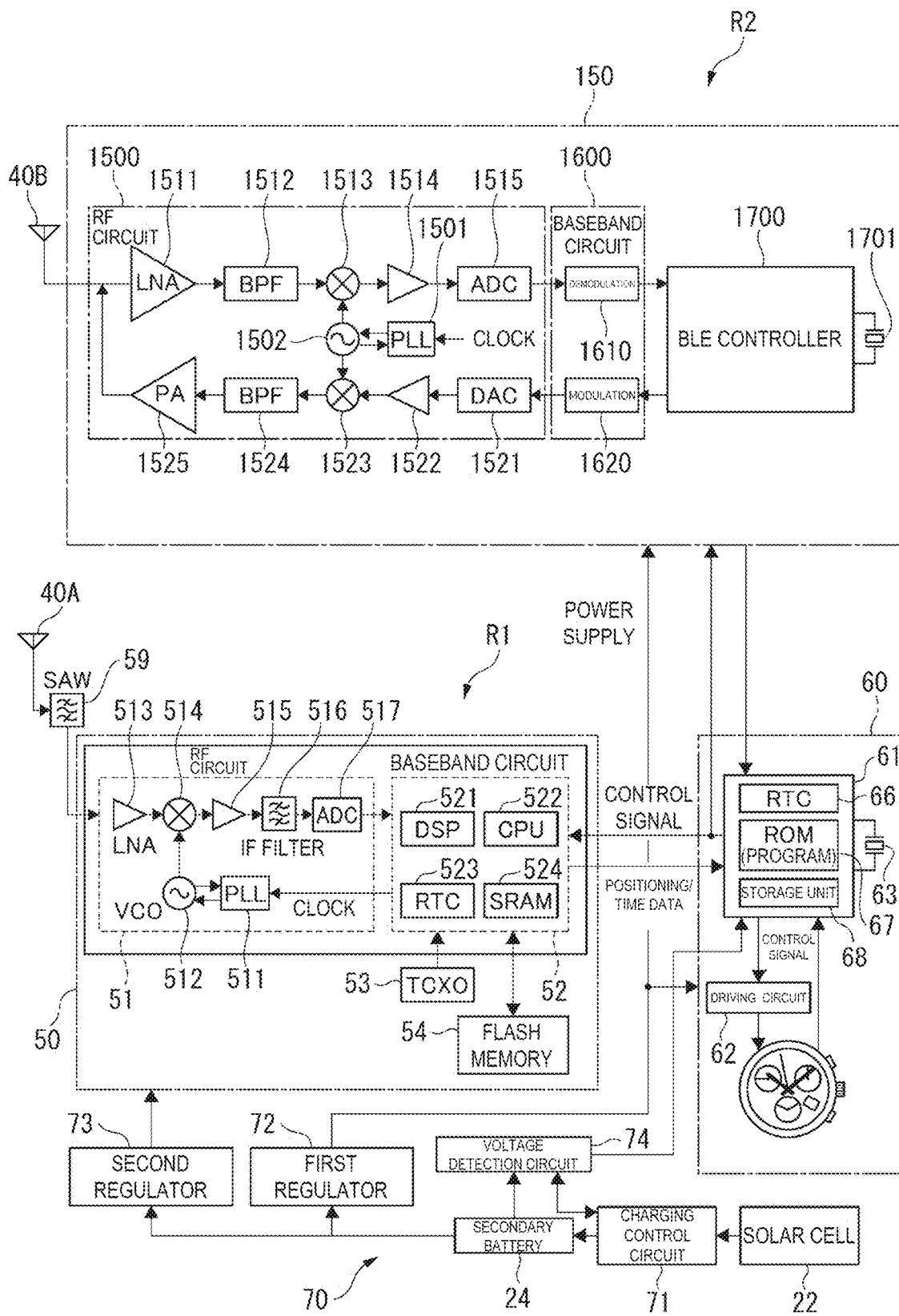
FIG. 4 is a block diagram illustrating a circuit configuration of the radio-controlled timepiece.

FIG. 4 is a block diagram illustrating a circuit configuration of the radio-controlled timepiece 1.

Radio-controlled timepiece 1 includes the control display module 60, the GPS receiving module 50, the short-range wireless communication module 150, and the power supply module 70, which are disposed on the printed wired board 25, respectively.

GPS Receiving Module

The GPS receiving module 50 receives satellite radio waves including first time information from the GPS satellites, which are the position information satellites S, via a GPS antenna 40A that is implemented by the feed element 403 and the parasitic element 402 of the ring antenna 40, and a surface acoustic wave (SAW) filter 59, and processes the satellite signals. Thus, the GPS receiving module 50, the GPS antenna 40A, and the SAW filter 59 are examples of components of a receiver R1 that receives the satellite radio waves including the first time information.

The SAW filter 59 is a bandpass filter that allows 1.5 GHz satellite signals to pass through. Note that a low noise amplifier (LNA) that improves reception sensitivity may be additionally inserted between the GPS antenna 40A and the SAW filter 59. Further, the SAW filter 59 may be incorporated in the GPS receiving module 50.

The GPS receiving module 50 processes the satellite signals that have passed through the SAW filter 59, and includes a radio frequency (RF) circuit 51, a baseband circuit 52, a temperature compensated crystal oscillator (TCXO) 53, and a flash memory 54.

The RF circuit 51 includes a phase locked loop (PLL) 511, a voltage controlled oscillator (VCO) 512, a low noise amplifier (LNA) 513, a mixer 514, an intermediate frequency (IF) amplifier 515, an IF filter 516, and an A/D converter (ADC) 517.

The PLL 511 and the VCO 512 generate a local oscillation signal at a frequency corresponding to the reception frequency from a clock generated by the TCXO 53.

The satellite signal that has passed through the SAW filter 59 is amplified by the LNA 513, then mixed with the local oscillation signal from the VCO 512 by the mixer 514, and down-converted to the IF signal in the IF band.

The IF signal outputted from the mixer 514 passes through the IF amplifier 515 and the IF filter 516, and is converted to a digital signal by the A/D converter (ADC) 517.

The baseband circuit 52 includes a digital signal processor (DSP) 521, a central processing unit (CPU) 522, a real time clock (RTC) 523, and a static random access memory (SRAM) 524.

Further, the TCXO 53, the flash memory 54, and the like are also coupled to the baseband circuit 52.

Then, the baseband circuit 52 is configured to acquire satellite time information and positioning information by receiving the digital signal from the ADC 517 of the RF circuit 51 and performing correlation processing, positioning calculation, and the like.

Further, since the baseband circuit 52 stores the leap second data that is included in the satellite signal in the SRAM 524, the baseband circuit 52 is configured to adjust the acquired satellite time information, that is, the Z count, by the leap second, and calculate UTC, which is Coordinated Universal Time, and output to the controller 61.

The clock that is a base of the local oscillation signal is supplied from TCXO 53 to the PLL 511 via the baseband circuit 52.

Data in Flash Memory

A time difference database and the like are stored in the flash memory 54. In the exemplary embodiment, information in the flash memory 54 is acquired from the nearby mobile device 100 by short-range wireless communication of the BLUETOOTH® Low Energy (BLE) standard and stored in the flash memory 54.

In the time difference database, the position information specified by the latitude and longitude is associated with the time difference information of the place. Thus, when the GPS receiving module 50 acquires position information in the positioning mode, the GPS receiving module 50 is configured to acquire time difference information, that is, time difference with respect to UTC based on the position information (latitude and longitude), and output the time difference to the controller 61.

Accordingly, the GPS receiving module 50, which is included in the receiver R1, outputs UTC as the first time information when the satellite radio wave is successfully received in the time measurement mode, and outputs UTC and the time difference information as the first time information when the satellite radio wave is successfully received in the positioning mode.

Short-Range Wireless Communication Module

The short-range wireless communication module 150 executes the short-range wireless communication based on the BLE standard by the short-range wireless communication antenna 40B that is implemented by the feed element 407 and the parasitic element 402 of the ring antenna 40, and receives and processes radio waves including the second time information transmitted from the nearby mobile device 100. Thus, the short-range wireless communication module 150 and the short-range wireless communication antenna 40B are examples of components of a short-range receiver R2 that receives radio waves including the second time information transmitted from the mobile device 100.

The short-range wireless communication module 150 includes a radio frequency (RF) circuit 1500, a baseband circuit 1600, a BLE controller 1700, and a crystal oscillator 1701 that generates a 16 MHz master clock.

The RF circuit 1500 is a circuit that down-converts the short-range wireless communication signal received through the short-range wireless communication antenna 40B into an IF signal suitable for demodulation, and up-converts the IF signal modulated by the transmission information into a high frequency signal.

In the RF circuit 1500, a low noise amplifier (LNA) 1511 performs high frequency amplification of the short-range wireless communication signal received by the short-range wireless communication antenna 40B, and a BPF 1512 removes noise in unnecessary bands from the LNA 1511.

A synthesizer constituted by a PLL 1501 and a VCO 1502 supplies a mixer 1513 with a local oscillation signal having a frequency corresponding to a selected frequency for reception.

The mixer 1513 down-converts the signal outputted via the BPF 1512 by mixing with the local oscillation signal, and outputs an IF signal.

An IF amplifier 1514 amplifies the IF signal and an analog digital converter (ADC) 1515 converts the IF signal outputted by the IF amplifier 1514 into a digital signal and supplies the converted signal to the baseband circuit 1600.

Further, in the RF circuit 1500, a digital analog converter (DAC) 1521 converts the digital signal modulated by the transmission information (baseband signal) into an IF signal, which is an analog signal, and an IF amplifier 1522 amplifies the IF signal.

A mixer 1523 up-converts an intermediate frequency signal outputted by the IF amplifier 1522 by mixing the intermediate frequency signal with the local oscillation signal generated by the synthesizer constituted by the PLL 1501 and the VCO 1502, and outputs a high frequency signal in a band corresponding to a selected frequency for transmission.

A BPF 1524 removes noise in unnecessary bands from the high frequency signals outputted by the mixer 1523.

A power amplifier (PA) 1525 amplifies the high frequency signal outputted by the BPF 1524 and the amplified high frequency signal is emitted from the short-range wireless communication antenna 40B.

The baseband circuit 1600 includes a demodulation circuit 1610 and a modulation circuit 1620.

Here, the demodulation circuit 1610 demodulates the received information from the digital IF signal outputted from the ADC 1515 of the RF circuit 1500, and supplies the demodulated information to the BLE controller 1700. The received information is transmission information transmitted from the mobile device 100, which is a communication partner, and includes the second time information. The second time information is specifically UTC and time difference information. That is, the mobile device 100 can acquire UTC and the time difference information of the current location via the mobile communication network or the like, and transmits UTC and the time difference information as the second time information. Thus, the demodulation circuit 1610 outputs the second time information, that is, UTC and the time difference information to the BLE controller 1700.

Further, the modulation circuit 1620 modulates the carrier by the transmission information supplied from the BLE controller 1700, generates an IF signal in a digital format, and supplies the generated IF signal to the DAC 1521 of the RF circuit 1500.

The BLE controller 1700 is a circuit that controls BLE communication with the mobile device 100 by controlling the RF circuit 1500 and the baseband circuit 1600.

Then, the BLE controller 1700 outputs UTC and the time difference information as the second time information received and acquired from the mobile device 100 to the controller 61.

Note that in the short-range wireless communication module 150 of the exemplary embodiment, communication is performed using BLE radio waves, but a module for receiving near field communication (NFC) radio waves may be used. Since the frequency of the NFC radio wave is 13.56 MHz, the antenna is a loop antenna with two to three turns, but can be configured as the ring antenna 40.

Control Display Module

The control display module 60 includes a controller (CPU) 61, a driving circuit 62 for driving the hands 3, 771, 781, 791, and 792, and the like, and a crystal oscillator 63.

The controller 61 includes a real time clock (RTC) 66, a ROM 67, and a storage unit 68.

The RTC 66 uses a reference signal outputted from the crystal oscillator 63 to measure an internal time. The time information generation controller is configured by the RTC 66. Various programs to be executed by the controller 61 are stored in the ROM 67. In the exemplary embodiment, the internal time that is measured by the RTC 66 is UTC, which is Coordinated Universal Time. The controller 61 updates the RTC 66 with UTC received from the receiver R1 when the reception in the time measurement mode or the positioning mode is successful, and the controller 61 updates the RTC 66 with UTC received from the short-range receiver R2 when the reception in the short-range wireless communication mode is successful.

The storage unit 68 stores satellite time information and positioning information outputted from the GPS receiving module 50 and time information outputted from the short-range wireless communication module 150. Further, the storage unit 68 stores the first time difference information that is the time difference between the time pointed by the hand 3 and UTC, and the second time difference information that is the time difference between the time pointed by the hands 791 and 792 and UTC.

Thus, the controller 61 stores the time difference information received from the receiver R1 as the first time difference information in the storage unit 68 when the reception is successful in the positioning mode, and the controller 61 stores the time difference information received from the short-range receiver R2 as the first time difference information in the storage unit 68 when the reception is successful in the short-range wireless communication mode.

The controller 61 selectively switches and activates the short-range wireless communication module 150 and the GPS receiving module 50 by outputting a control signal to the short-range wireless communication module 150 and the GPS receiving module 50.

The frequency of the GPS satellite signal is high, which is approximately 1.5 GHz, and the intensity of the reception signal of the GPS satellite is weak, which is about 1/100 of the reception signal of the short-range wireless communication. Thus, the GPS satellite signal reception processing by the GPS receiving module 50 requires a large amount of power. Therefore, the controller 61 does not activate the short-range wireless communication module 150 and the GPS receiving module 50 at the same time, but the controller 61 selectively switches and activates the short-range wireless communication module 150 and the GPS receiving module 50.

The radio-controlled timepiece 1 of the exemplary embodiment includes the short-range wireless communication module 150, the GPS receiving module 50, and the control display module 60, so that it is possible to correct the displayed time based on the time information acquired by short-range wireless communication or the time information received from the position information satellite S.

Power Supply Module

The power supply module 70 includes a charging control circuit 71, a first regulator 72, a second regulator 73, and a voltage detection circuit 74.

When light is incident on the solar cell panel 22 and the solar cell panel 22 generates power, the charging control circuit 71 supplies power obtained by the optical power generation to the secondary battery 24 to charge the secondary battery 24.

The secondary battery 24 supplies drive power to the control display module 60 and the short-range wireless communication module 150 via the first regulator 72 and supplies drive power to the GPS receiving module 50 via the second regulator 73. In this way, a power supply unit that supplies the drive power is configured by the secondary battery 24.

The voltage detection circuit 74 monitors the output voltage of the secondary battery 24 and outputs the output voltage to the controller 61.

That is, the voltage detection circuit 74 functions as a battery remaining amount detector for detecting the battery remaining amount of the secondary battery 24, which is the power supply unit.

Since the battery voltage detected by the voltage detection circuit 74 is inputted to the controller 61, the controller 61 can control the reception processing by grasping the voltage of the secondary battery 24.

Further, by the control from the controller 61, the charging control circuit 71 can control so that the voltage of the solar cell panel 22 is detected by the voltage detection circuit 74 in a state in which the solar cell panel 22 is separated from the secondary battery 24.

In this case, the voltage detection circuit 74 can detect the generated voltage (power generation amount) of the solar cell panel 22 without being affected by the voltage of the secondary battery 24.

Accordingly, the voltage detection circuit 74 constitutes a power generation amount detector that detects the amount of power generated by the solar cell panel 22, and this power generation amount is inputted to the controller 61.

Thus, the controller 61 can determine whether the radio-controlled timepiece 1 is irradiated with light having a light amount equal to or higher than a threshold level based on the amount of power generated by the solar cell panel 22, that is, whether the radio-controlled timepiece 1 is disposed outdoors. Accordingly, the solar cell panel 22, the charging control circuit 71, and the voltage detection circuit 74 are examples of components of an optical sensor that detects whether the amount of light emitted to the radio-controlled timepiece 1 is equal to or higher than the threshold level.

Configuration of Controller

Figure 5:
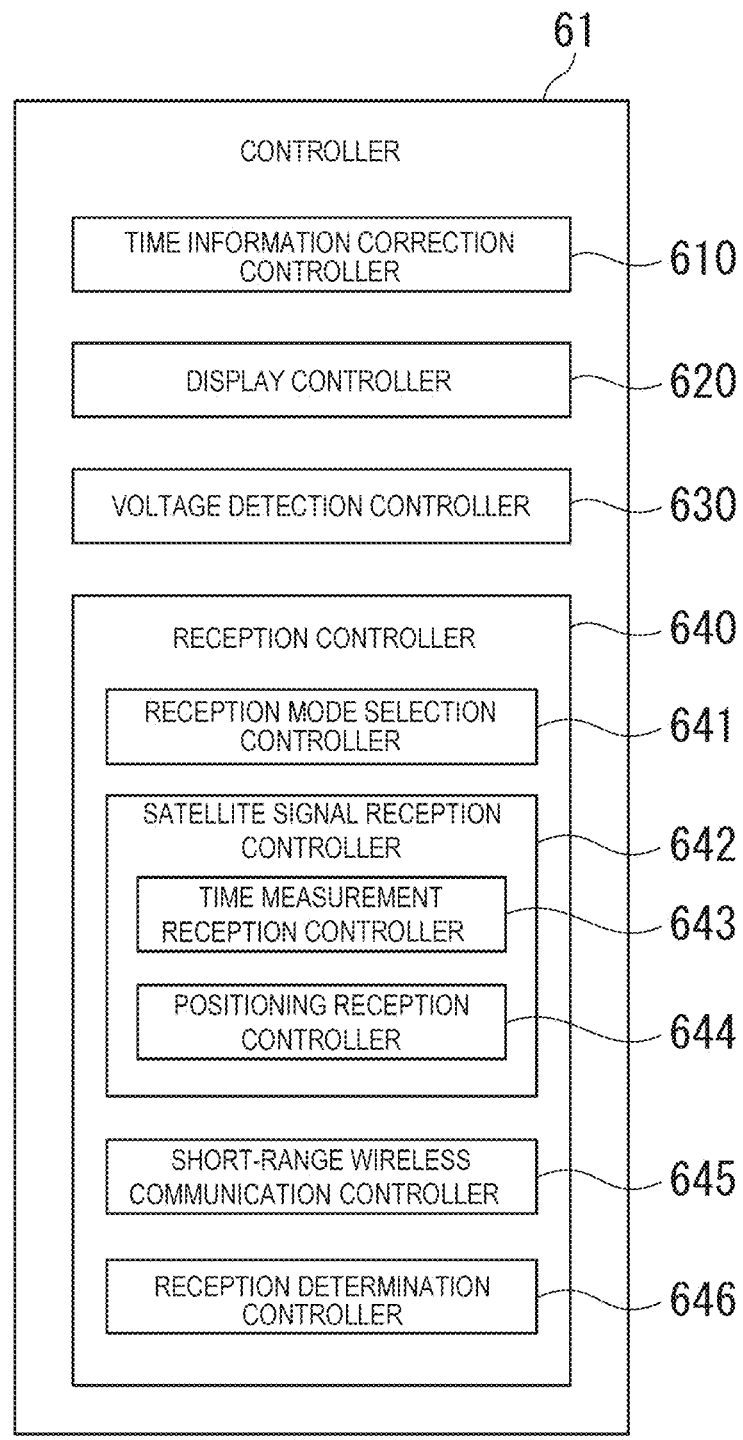
FIG. 5 is a block diagram illustrating a configuration of a controller of the radio-controlled timepiece.

FIG. 5 is a block diagram illustrating a functional configuration of the controller 61.

In FIG. 5, a time information correction controller 610, a display controller 620, a voltage detection controller 630, and a reception controller 640 are functions implemented by the controller 61, which is the CPU, executing a program stored in the ROM 67.

Time Information Correction Controller

By controlling the reception controller 640, the time information correction controller 610 executes processing of receiving the time information and updating the internal time, and processing of correcting the internal time when the time is manually corrected by the crown 6.

For example, when the time information is received and UTC is acquired, the time information correction controller 610 updates the internal time that is measured by the RTC 66 with the acquired UTC. Additionally, when the time information is received and the first time difference information is also acquired, the time information correction controller 610 updates the first time difference information stored in the storage unit 68 with the acquired time difference information.

In addition, when the crown 6 is pulled out to the first stage and turned, the time information correction controller 610 updates the internal time that is measured by the RTC 66 in accordance with the amount of rotation of the crown 6, and corrects the time that is pointed by the hand 3 of the basic timepiece. Further, when the crown 6 is pulled out to the second stage and turned, the time information correction controller 610 updates the second time difference information stored in the storage unit 68 in accordance with the amount of rotation of the crown 6, and corrects the time that is pointed by the hands 791 and 792 of the small timepiece.

Display Controller

In the normal mode, the display controller 620 controls the driving circuit 62 based on the internal time measured by the RTC 66 and the time difference information stored in the storage unit 68, so that the hand 3 displays the time (hour, minute, and second) of the basic timepiece and the hands 791 and 792 display the time (hour and minute) of the small timepiece.

The basic timepiece usually displays the local time, which is the time of the current location. The small timepiece usually displays the home time, which is the time of the place where people live.

When the internal time measured by the RTC 66 and the first time difference information are updated by the time information correction controller 610, the display controller 620 corrects the time that is pointed by the hand 3 of the basic timepiece. Further, when the second time difference information is updated by the time information correction controller 610, the display controller 620 corrects the time that is pointed by the hands 791 and 792 of the small timepiece.

Thus, the time correction controller that corrects the display time based on the time information acquired in the reception processing is constituted by the time information correction controller 610 and the display controller 620.

Further, the display controller 620 controls the display by the hand 781 in accordance with the remaining battery amount, the reception control state, and the like.

Voltage Detection Controller

The voltage detection controller 630 detects the voltage of the secondary battery 24, that is, the amount of power storage and the amount of power generated by the solar cell panel 22 by the voltage detection circuit 74. The voltage detection controller 630 detects the voltage by the voltage detection circuit 74 at regular time intervals. The voltage detection controller 630 also controls the operation of the charging control circuit 71.

Reception Controller

The reception controller 640 includes a reception mode selection controller 641, a satellite signal reception controller 642, a short-range wireless communication controller 645, and a reception determination controller 646.

Reception Mode Selection Controller

The reception mode selection controller 641 executes selection of various reception processes by detecting predetermined operations by the A button 7A and the B button 7B, which are included in the operating device.

Specifically, the reception mode selection controller 641 selects the time measurement mode and activates a time measurement reception controller 643 described later when the operation for the time measurement reception is performed by the operating device, and the reception mode selection controller 641 selects the positioning mode and activates a positioning reception controller 644 described later when the operation for the positioning reception is performed by the operating device.

Further, the reception mode selection controller 641 selects the short-range wireless communication mode and activates a short-range wireless communication controller 645 described later when the operation for the short-range wireless communication is performed by the operating device.

Specific operation for the time measurement reception, operation for the positioning reception, and operation for the short-range wireless communication may be set according to the number and type of elements of operating device provided in the radio-controlled timepiece 1. For example, a predetermined operation A for pressing the A button 7A for less than three seconds is an example of the operation for the time measurement reception, a predetermined operation B for pressing the A button 7A for three seconds or longer is an example of the operation for the positioning reception, and a predetermined operation C for pressing the B button 7B for three seconds or longer is an example of the operation for the short-range wireless communication.

Further, the reception mode selection controller 641 activates the time measurement reception controller 643 when it is determined that an automatic reception condition is satisfied, as will be described later.

Accordingly, the reception controller 640 selectively activates the time measurement reception controller 643, the positioning reception controller 644, and the short-range wireless communication controller 645 to selectively control each reception processing.

Satellite Signal Reception Controller

The satellite signal reception controller 642 includes the time measurement reception controller 643 and the positioning reception controller 644.

The time measurement reception controller 643 activates the GPS receiving module 50 to capture at least one position information satellite S and receives a satellite signal, acquires the first time information from the received satellite signal, and executes a time measurement reception processing for correcting the internal time. Specifically, the time measurement reception controller 643 acquires UTC as the first time information, and updates the internal time measured by the RTC 66 with the acquired UTC.

The positioning reception controller 644 activates the GPS receiving module 50 to capture a plurality of position information satellites S, receives the satellite signals, performs the positioning based on the plurality of received satellite signals, and executes a positioning reception processing for correcting the internal time based on the time information obtained based on the positioning result.

Specifically, the positioning reception controller 644 acquires UTC and the first time difference information as the first time information, updates the internal time measured by the RTC 66 with the acquired UTC, and stores the acquired first time difference information in the storage unit 68.

Short-Range Wireless Communication Controller

The short-range wireless communication controller 645 activates the short-range wireless communication module 150 to perform short-range wireless communication (BLE communication) by BLE with the mobile device 100 near the radio-controlled timepiece 1, and acquires time information by this short-range wireless communication to correct the internal time. Specifically, the short-range wireless communication controller 645 acquires UTC and the first time difference information as the second time information, updates the internal time by the RTC 66 with the acquired UTC, and stores the acquired first time difference information in the storage unit 68.

Reception Determination Controller

The reception determination controller 646 has a function of determining whether the time information is successfully received.

when the received time information does not exist as time information such as "25 o'clock" or "70 minutes", the reception determination controller 646 determines that the reception of time information has failed.

when the received time information may exist, the reception determination controller 646 compares the received time information with the internal time measured by the RTC 66. For example, when the Z count, which is the satellite time information, is acquired from the satellite signal, the reception determination controller 646 compares the time that the Z count is adjusted by a current leap second with the internal time of the RTC 66. Also, when the time information is acquired by the short-range wireless communication, the reception determination controller 646 compares the acquired time information with the internal time of the RTC 66.

The reception determination controller 646 determines that the reception of the time information is successful when a difference between the time information acquired by the reception and the internal time of the RTC 66 is small.

When the difference is large, the reception determination controller 646 determines whether there is consistency based on the received time information. For example, when the satellite signal is received, the reception determination controller 646 determines whether the acquired time information is consistent by acquiring the Z counts of a plurality of subframes and comparing the Z counts of the two. When there are a plurality of captured position information satellites S, the reception determination controller 646 determines whether the acquired time information is consistent by comparing respective Z counts acquired from the plurality of position information satellites S. Also, when the time information is acquired by the short-range wireless communication, the reception determination controller 646 determines whether the acquired time information is consistent by acquiring and comparing a plurality of pieces of time information.

The time information correction controller 610 corrects the time when the reception determination controller 646 determines that the time information is consistent.

Presetting of Smartphone

An application for communicating with the radio-controlled timepiece 1 is installed in the mobile device 100 in advance.

Figure 6:
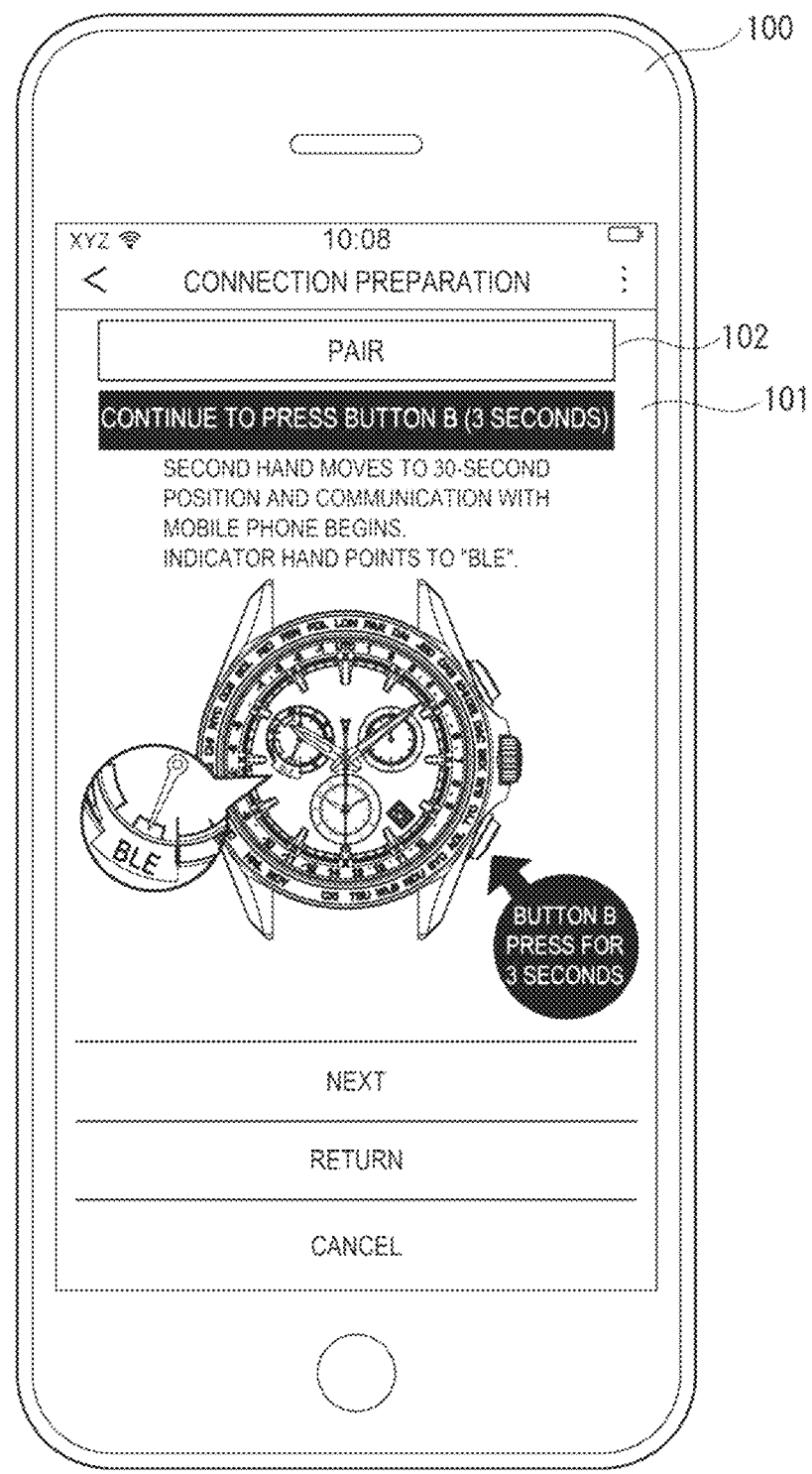
FIG. 6 is a diagram illustrating a screen display example of the mobile device.

Next, pairing is executed for initial setting of BLE communication between the radio-controlled timepiece 1 and the mobile device 100. That is, when the BLUETOOTH® setting of the radio-controlled timepiece 1 is turned on, the application installed on the radio-controlled timepiece 1 is activated, and the menu for connecting preparation is selected, the pairing screen illustrated in FIG. 6 is displayed on the display 101 of the mobile device 100.

When the user touches an operation menu 102 displayed as "PAIR" on the display 101, the mobile device 100 shifts to a pairing state.

Then, when the user refers to a guidance on the display 101 and presses the B button 7B of the radio-controlled timepiece 1 for three seconds or longer, the second hand 3B moves to the 30-second position, and the hand 781, which is the indicator hand, points the "BLE" in the second small window 780 and performs pairing with the mobile device 100. Since the pairing is similar to the common pairing between BLUETOOTH® devices, the description thereof will be omitted.

Reception Control of Electronic Timepiece

Figure 7:
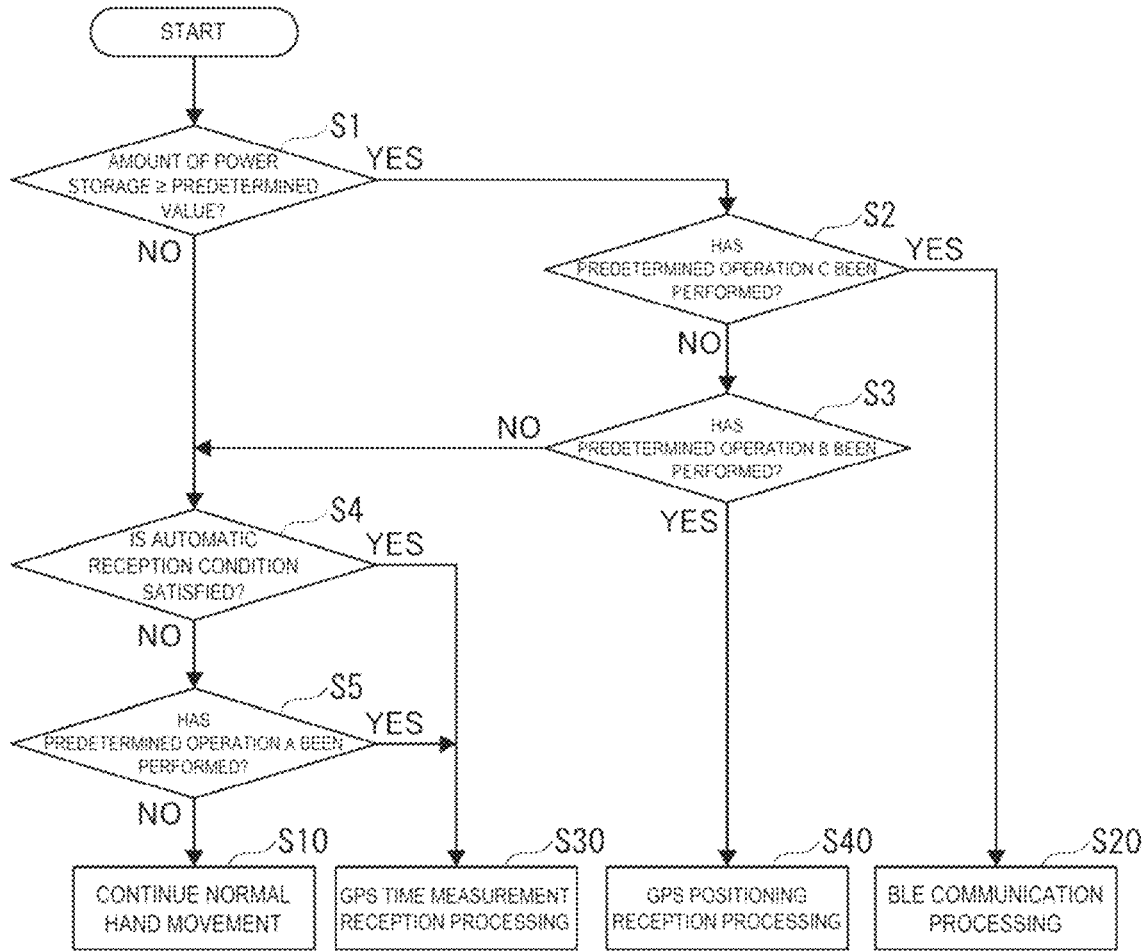
FIG. 7 is a flowchart illustrating a reception processing of the radio-controlled timepiece.

Next, the control by the controller 61 of the radio-controlled timepiece 1 will be described with reference to a flowchart of FIG. 7. Note that FIG. 7 illustrates the control in a normal mode that is not set to the in-flight mode.

In the exemplary embodiment, the voltage detection circuit 74 is activated at regular intervals, for example, at intervals of 60 seconds under the control of the voltage detection controller 630, and detects the battery voltage of the secondary battery 24.

The controller 61 determines whether the remaining battery amount, that is, the amount of power storage, of the secondary battery 24 detected by the voltage detection circuit 74 is equal to or higher than a predetermined value (step S1). Here, the voltage detection controller 630 sets a voltage as the predetermined value to be compared with the battery voltage of the secondary battery 24 so that the controller 61 does not go down even when the GPS positioning reception processing or the short-range wireless communication processing is performed. For example, the predetermined value is 3.6 V, and this value may be set based on the discharging characteristics of the secondary battery 24.

When the controller 61 determines YES in step S1, the controller 61 determines whether the predetermined operation C has been performed (step S2). The predetermined operation C is the short-range wireless communication operation, specifically the same operation as when pairing, and is the operation of pressing the B button 7B for three seconds or longer.

When the controller 61 determines YES in step S2, the reception mode selection controller 641 activates the short-range wireless communication controller 645 and starts the BLE communication processing (step S20). As a typical example in which the BLE communication processing is executed, there is a case where it is necessary to acquire time information in a situation where it is difficult to receive GPS satellite signals, such as when a user wearing the radio-controlled timepiece 1 is located indoors.

When the controller 61 determines NO in step S2, the controller 61 determines whether the predetermined operation B has been performed (step S3). The predetermined operation B is the positioning reception operation, and specifically the operation of pressing the A button 7A for three seconds or longer.

When the controller 61 determines YES in step S3, the reception mode selection controller 641 activates the positioning reception controller 644 and starts the GPS positioning reception processing (step S40).

When the controller 61 determines NO in step S1 or NO in step S3, the controller 61 determines whether the automatic reception condition is satisfied (step S4). Here, the automatic reception condition of the exemplary embodiment is a case where the preset reception time has come.

When the controller 61 determines NO in step S4, the controller 61 executes step S5 for determining whether the predetermined operation A has been performed. The predetermined operation A is the time measurement reception operation, and specifically, the operation of pressing the A button 7A for less than three seconds.

When the controller 61 determines YES in step S4 or YES in step S5, the controller 61 activates the time measurement reception controller 643 by the reception mode selection controller 641, and starts the GPS time measurement reception processing (step S30).

When the controller 61 determines NO in step S5, that is, when the automatic reception condition is not satisfied and none of the predetermined operations A to C has been performed, the controller 61 continues the normal hand movement by the display controller 620 (step S10).

The controller 61 repeatedly executes the above processes at predetermined time intervals.

BLE Communication Process

Figure 8:
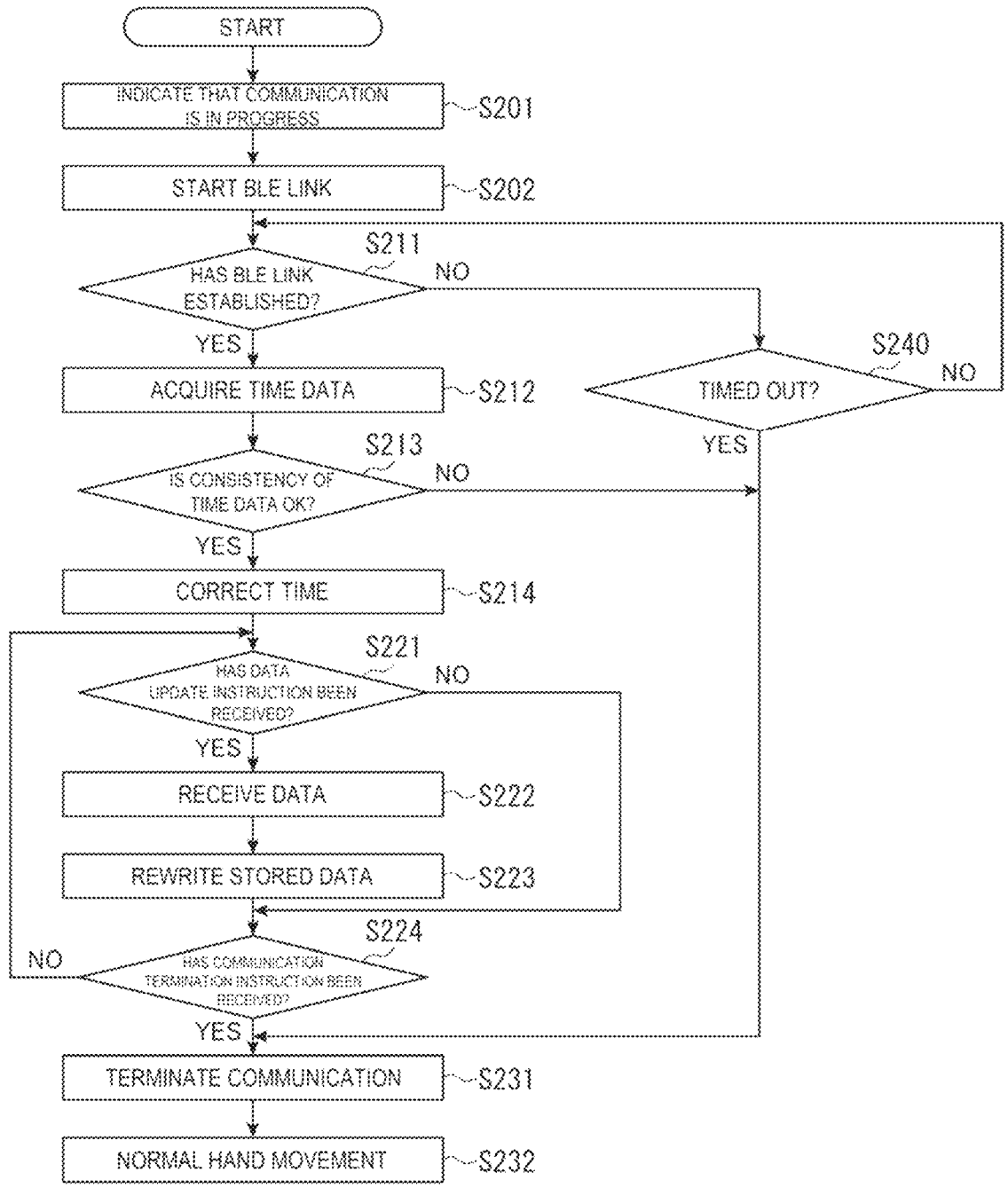
FIG. 8 is a flowchart illustrating BLE communication processing of the radio-controlled timepiece.

Next, the BLE communication processing of step S20 will be described with reference to a flowchart of FIG. 8.

When the short-range wireless communication controller 645 is activated, the display controller 620 points with the hand 781 that BLE communication is in progress (step S201). Specifically, the hand 781 points the letters "BLE" in the second small window 780.

Next, the short-range wireless communication controller 645 starts a process of establishing a BLE link with the mobile device 100 by the short-range wireless communication module 150 (step S202).

Next, the short-range wireless communication controller 645 determines whether the BLE link has been established (step S211).

When the determination result is "NO", the short-range wireless communication controller 645 determines whether a predetermined time-out period has elapsed (step S240).

When the determination result is "NO", the short-range wireless communication controller 645 repeats the determination in step S211.

When the time-out period has elapsed without the BLE link being established, the determination result in step S240 becomes "YES".

In this case, the short-range wireless communication controller 645 terminates the communication (step S231).

Consequently, the controller 61 returns the hand movement to the normal hand movement (step S232).

Then, the step of the controller 61 returns to step S1 in FIG. 7.

When the BLE link is established before the time-out period elapses, the determination result in step S211 becomes "YES" and the short-range wireless communication controller 645 acquires time information from the nearby mobile device 100 by the short-range wireless communication module 150 (step S212). The time information is the information of the time difference between UTC and the time of the current location, and is the example of the second time information.

Next, the reception determination controller 646 determines whether the time information acquired from the mobile device 100 is consistent (step S213).

Specifically, as described above, the reception determination controller 646 compares UTC, which is the acquired time information, with the internal time of the RTC 66 of the controller 61, and confirms whether the acquired time information is consistent, depending on whether the difference is within a predetermined value or the like.

When the determination result in step S213 is "NO", the short-range wireless communication controller 645 terminates the communication (step S231). Consequently, the controller 61 returns the hand movement to the normal hand movement (step S232). Then, the step of the controller 61 returns to step S1 in FIG. 7.

Note that, when the determination result in step S213 is "NO", the short-range wireless communication controller 645 may notify the mobile device 100 that the time information was inconsistent. When the inconsistency of the time information is notified, the mobile device 100 may display a confirmation button on the display 101 asking whether the time of the radio-controlled timepiece 1 may be updated with the time information of the mobile device 100 although the time information was inconsistent, and when the user presses the button, the process may proceed to step S214, which will be described later.

when the determination result in step S213 is "YES", the time information correction controller 610 corrects the internal time and the first time difference information of the RTC 66 of the controller 61 according to the time information acquired from the mobile device 100, and the display controller 620 corrects the display time that is pointed by the hand 3 in accordance with the corrected internal time and the first time difference information (step S214).

Next, the short-range wireless communication controller 645 determines whether a data update instruction for a time difference database and the like has been received from the mobile device 100 (step S221).

In the exemplary embodiment, when the user wants to rewrite the stored data in the flash memory 54 of the radio-controlled timepiece 1, the user activates an application program for data rewriting that is installed in the mobile device 100, causes the mobile device 100 to transmit the data update instruction to the radio wave correction timepiece 1, and causes the mobile device 100 to transmit data such as the time difference database downloaded in advance to the radio-controlled timepiece 1.

In step S221, the reception determination controller 646 determines whether the data update instruction from the mobile device 100 has been received.

When the determination result in step S221 is "NO", the reception determination controller 646 determines whether a communication termination instruction has been received from the mobile device 100 (step S224).

When the determination result in step S224 is "NO", the reception determination controller 646 repeats the determination in step S221.

When the data update indication is received from the mobile device 100 and the determination result in step S221 is "YES", the short-range wireless communication controller 645 receives data such as the time difference database from the mobile device 100 by the short-range wireless communication module 150 (step S222), and rewrites the data in the flash memory 54 of the GPS receiving module 50 with the received data (step S223).

Then, the reception determination controller 646 determines whether the communication termination instruction has been received from the mobile device 100 (step S224).

Then, when the communication termination instruction is received from the mobile device 100, the determination result in step S224 becomes "YES".

Consequently, the controller 61 terminates the communication (step S231) and returns the hand movement to the normal hand movement (step S232).

Then, the step of the controller 61 returns to step S1 in FIG. 7.

Further, in the short-range wireless communication processing, in addition to the time information and the time difference database, by using the application of the mobile device 100, it is possible to update the time zone information, which is the time difference information, and the daylight saving time information, and acquire the assist data.

Figure 9:
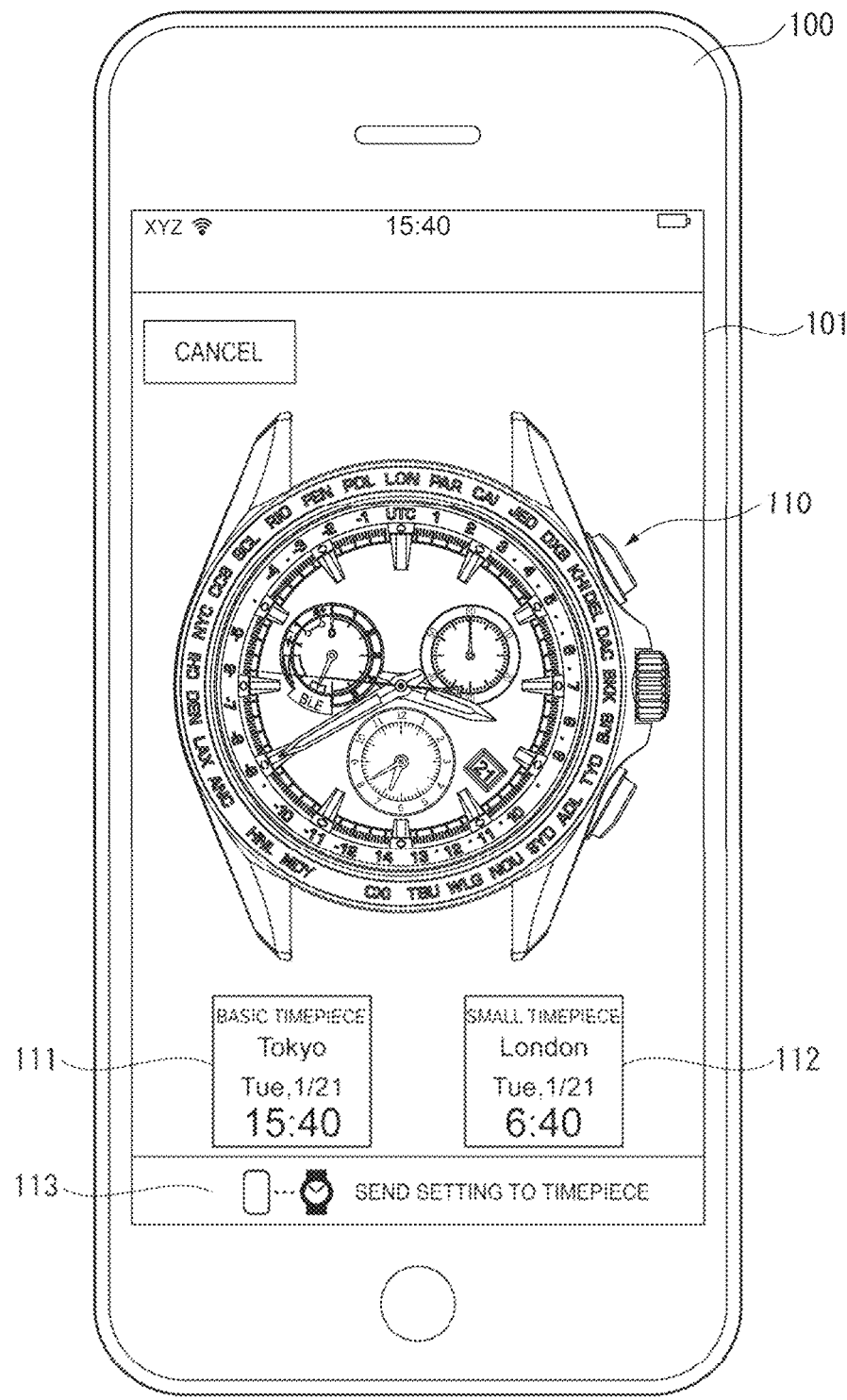
FIG. 9 is a diagram illustrating a screen display example of the mobile device.

For example, when changing the time zone information for the basic timepiece and the small timepiece, the application of the mobile device 100 displays the time zone correction screen 110 on the display 101, as illustrated in FIG. 9. On the time zone correction screen 110, a basic timepiece correction screen 111 for correcting the time zone, date, and time of the basic timepiece that is pointed by the hand 3, and a small timepiece correction screen 112 for correcting the time zone, date, and time of the small timepiece that is pointed by the hands 791 and 792 are displayed. When the user taps each screen 111 or 112 and flicks the tapped screen up or down, the time zone is changed, and the date and time are also changed in conjunction with the time zone.

Then, when a button 113 displaying "Send setting to timepiece" is pressed, time zone information of both screens 111 and 112 is transmitted to the radio-controlled timepiece 1, and the time zones of the basic timepiece and the small timepiece, that is, the first time difference information and the second time difference information can be changed.

Time Measurement Reception Process

Figure 10:
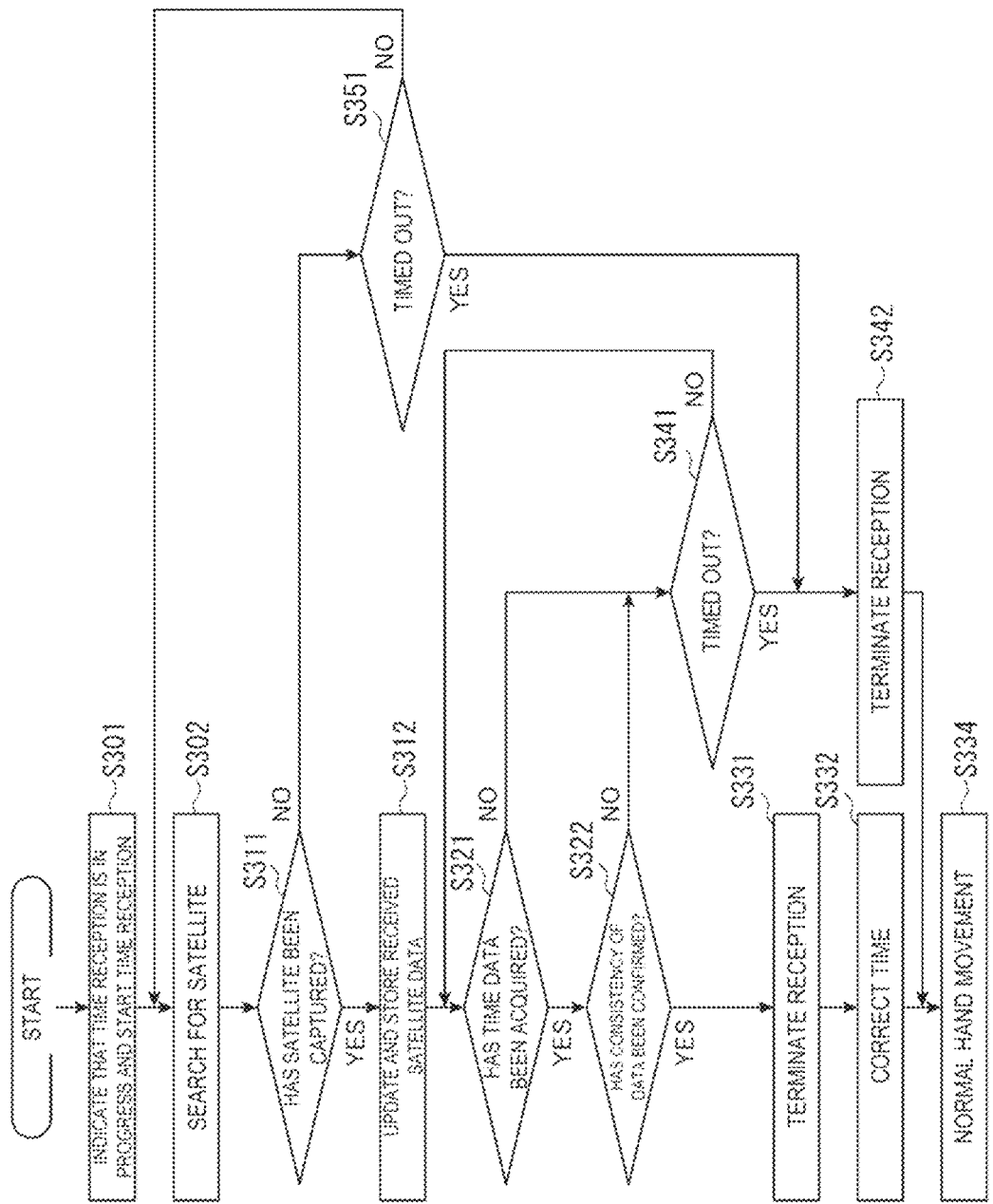
FIG. 10 is a flowchart illustrating a GPS time measurement reception processing of the radio-controlled timepiece.

Next, the GPS time measurement reception processing in step S30 will be described with reference to a flowchart of FIG. 10. Hereinafter, the GPS time measurement reception processing is simply referred to as a time measurement reception processing.

The time measurement reception processing is executed by the time measurement reception controller 643 of the controller 61 controlling the GPS receiving module 50.

When the time measurement reception controller 643 starts the time measurement reception processing the time measurement reception controller 643 first points "1" with the hand 781 to indicate that the time measurement mode is in progress, and activates the GPS receiving module 50 to start time reception (step S301).

Next, the time measurement reception controller 643 starts the satellite search by the GPS receiving module 50 (step S302).

Then, the time measurement reception controller 643 determines whether the GPS receiving module 50 has captured a satellite (step S311).

When the determination result is "NO", the time measurement reception controller 643 determines whether the elapsed time from the start of the time measurement reception has reached a predetermined time-out period (for example, 15 seconds) for capturing the satellite (step S351).

When the determination result in step S351 becomes "YES" due to the time-out, the time measurement reception controller 643 terminates the reception by the GPS receiving module 50 (step S342).

Consequently, the controller 61 returns the hand 781 to the normal hand movement as a battery remaining amount display (step S334).

Note that, since the frequency of the GPS satellite signal is a high frequency, which is approximately 1.5 GHz, and is not affected by motor noise, in the exemplary embodiment, the movement of the hand 3 is continued even while the satellite signal is being received. But the hand movement may be stopped.

On the other hand, when the time-out has not occurred when proceeding from step S311 to step S351 and the determination result in step S351 is "NO", the time measurement reception controller 643 continues the satellite search process by the GPS receiving module 50 (step S302).

When it is confirmed that the satellite has been captured when proceeding from step S302 to step S311, and the determination result in step S311 is "YES", the time measurement reception controller 643 stores the satellite data related to the position information satellite S captured by the GPS receiving module 50 in the flash memory 54 (step S312).

In the flash memory 54, satellite data captured at the time of past reception is stored together with information indicating a reception time zone.

Then, when the GPS receiving module 50 captures a new position information satellite S having data different from the stored satellite data in the same time zone as the time zone in which the satellite data stored in the flash memory 54 was captured, the time measurement reception controller 643, in step S312, updates the satellite data in the same time zone in the flash memory 54 by the newly captured satellite data.

The satellite data stored in the flash memory 54 is utilized during the satellite search in step S302.

That is, in general, a position information satellite, for example, a GPS satellite, orbits the earth in approximately 12 hours, and the earth also rotates, so that by searching for the position information satellite at the same place at the same time, for example, 24 hours later, it is highly possible that the same position information satellite as that captured in the past, for example, the previous time can be captured.

Thus, when the satellite data captured in the same time zone exists in the flash memory 54 during the satellite search in step S302, the probability that the position information satellite S can be captured in a short time is improved by prioritizing the search for that satellite.

Accordingly, the time measurement reception controller 643 refers to the satellite data stored in the flash memory 54 at the time of the satellite search in step S302, and when satellite data in the same time zone is stored, the search for that satellite is prioritized, and when the satellite data is not stored, the position information satellite S is searched in a predetermined order.

When the storage of the satellite data in the flash memory 54 (step S312) is completed, the time measurement reception controller 643 determines whether time information has been acquired from the satellite captured by the GPS receiving module 50 (step S321). That is, it is determined whether the Z count has been acquired as the time information.

Note that, when a plurality of satellites have been captured, the time information may be acquired from a satellite signal having a high signal-to-noise ratio (SNR), or the successful acquisition of time information may be determined by acquiring time information from each of the plurality of satellites and confirming the consistency of the time information.

when the determination result in step S321 is "NO", the time measurement reception controller 643 determines whether the elapsed time from the time when the process proceeds from step S312 to step S321 has reached a predetermined time-out period (for example, 60 seconds) (step S341).

When the determination result in step S341 is "NO", the time measurement reception controller 643 repeats the process in step S321.

In the GPS satellite signal, the Z count can be received at intervals of six seconds, so that when the time-out period of step S341 is 60 seconds, the Z count can be received up to 10 times until the time-out.

When the elapsed time becomes equal to or longer than the time-out period and the determination result in step S341 is "YES", the GPS receiving module 50 terminates the reception processing (step S342). Consequently, the controller 61 returns the hand movement to the normal hand movement (step 334).

On the other hand, when the time data has been acquired at that time when the process proceeds to step S321, the determination result in step S321 becomes "YES", and the time measurement reception controller 643 confirms the consistency of the acquired time information (step S322).

Specifically, when the first Z count is acquired, the time measurement reception controller 643 compares the time that the Z count is adjusted by the leap second with the internal time of the RTC 66 of the controller 61, and confirms whether the consistency is achieved by checking whether the difference is within a predetermined value (step S322).

In this step S322, when the difference between the compared times is larger than the predetermined value, for example, when there is a difference of five seconds or more, then it is determined that the consistency is not achieved.

Then, in step S322, when it is determined as "NO" because the consistency is not achieved, the time measurement reception controller 643 executes the processes of step S341 and the subsequent steps.

Accordingly, when the acquired time information is not consistent with the internal time, the time measurement reception controller 643 acquires the Z count of the subframe after the next six seconds.

On the other hand, when the time measurement reception controller 643 acquires a plurality of Z counts and the plurality of Z counts are consistent with each other, that is, when the data are at six second intervals, the acquired Z counts are consistent so that it is determined as "YES" in step S322.

When the time measurement reception controller 643 determines "YES" in step S322, the reception is terminated (step S331).

Next, the time information correction controller 610 corrects the internal time based on the acquired time information, and the display controller 620 corrects the display time pointed by the hand 3 in accordance with the corrected internal time and the first time information stored in the storage unit 68 (step S332).

When the time information correction controller 610 corrects the internal time, the display controller 620 corrects the display time pointed by the hand 3 via the driving circuit 62 based on the corrected internal time, returns the hand 781 to the battery remaining amount display, and returns the hand movement to the normal hand movement (step S334).

With the above, the time measurement reception processing is completed.

When the time measurement reception processing is completed, the controller 61 returns to step S1 in FIG. 7 to continue the process.

In the time measurement reception processing time information can be acquired in a reception time of approximately 5 to 15 seconds, and only one satellite needs to be captured, which saves power and is excellent in reception sensitivity.

GPS Positioning Reception Process

The GPS positioning reception processing in step S40 differs from GPS time measurement reception processing in step S30, for example, in that the number of satellites to be captured is at least three, usually four, and that the satellite orbit data is acquired for positioning and the positioning calculation is performed. Except for these, since the GPS positioning reception processing is same as the GPS time measurement reception processing the description thereof will be omitted. Note that, in the GPS positioning reception processing by performing the positioning calculation, the position information of the point where the reception processing is performed can be acquired. Therefore, based on the acquired position information and the time difference database stored in the flash memory 54, the time difference information of the current location can be acquired, and the time difference information that is related to the local time can be corrected.

Note that the time measurement reception processing may need to receive a Z count, which is the time information, from only one satellite, so that the Z count can be received even in an environment where the sky cannot be seen, for example, the Z count can be received by the window even in building areas or indoors. In addition, since it is possible to receive only the Z count without receiving satellite orbit data, the time required for reception is short, and the reception success rate is higher compared to the positioning reception processing However, since the positioning calculation is not performed, the time zone cannot be automatically corrected by the time measurement reception processing.

On the other hand, the positioning reception processing that performs the positioning calculation needs to receive satellite orbit data from three or more satellites, and in general, a reception time of 30 seconds or longer is required, and the reception success rate is low unless the environment is outdoors where the sky can be seen. Thus, the positioning reception processing is not suitable for automatic reception, and manual reception that starts reception at the user's will is more suitable.

Reception Control in In-Flight Mode

When the in-flight mode is executed, the controller 61 does not executes the automatic reception. That is, the reception control in the in-flight mode differs from the reception control in the normal mode illustrated in FIG. 7 only in that the determination process in step S4 is not performed. Therefore, the description of the reception control in the in-flight mode will be omitted.

Advantageous Effects of First Embodiment

The radio-controlled timepiece 1 of the exemplary embodiment includes the receiver R1 configured to receive satellite radio waves including time information, the short-range receiver R2 configured to receive radio waves including time information transmitted from the mobile device 100, the A button 7A and the B button 7B, which constitute the operating device configured to accept the instruction operation, the reception controller 640 configured to perform the first reception processing with the receiver at the preset time, operate the second reception processing by the short-range receiver in response to the instruction operation from the operating device, and selectively control the first reception processing and the second reception processing and the time information correction controller 610 and the display controller 620, which constitute the time correction controller, configured to correct the display time based on the time information acquired in the first reception processing or the time information acquired in the second reception processing.

Thus, the time correction automatically performed every day is performed by the first reception processing that is, the GPS time measurement reception processing which is executed at the preset time. On the other hand, the second reception processing that is, the BLE communication processing is executed when the user presses the B button 7B to perform the instruction operation.

For the BLE communication processing, it is necessary to activate the application of the mobile device 100 in advance, and for the purpose of daily time correction, the user needs to activate the application each time the BLE communication processing is performed, which makes the operation complicated for the user.

In addition, when the application of the mobile device 100 is kept running, a part of the internal memory of the mobile device 100 is occupied and the battery is also consumed.

In contrast, in the exemplary embodiment, since the daily scheduled reception is the GPS time measurement reception processing and the BLE communication processing only needs to be executed when the user needs to operate, the operation becomes less complicated for the user, and the memory occupancy of the mobile device 100 and the consumption of the battery can be suppressed.

Since the first reception processing is automatically executed at the preset time, the radio-controlled timepiece 1 can continue to display the accurate time all over the world without any operation by the user. In particular, normally, since the user stays in the same area where the time zone does not change, by automatically performing GPS time measurement reception processing every day, which consumes less power than BLE communication the radio-controlled timepiece 1 can be automatically adjusted at the correct time and the power consumption also can be suppressed.

In addition, since the radio-controlled timepiece 1 does not cooperate with the mobile device 100 in daily life, there is no need to activate the dedicated application on the mobile device 100, and it is also possible to minimize the user's dissatisfaction that the mobile device 100 cannot be connected.

When the user operates the operating device to execute the second reception processing the time zone can be corrected even indoors where the GPS satellite signal does not reach, and the time can be adjusted to the correct time of the current location. For example, when the user gets on an airplane and moves across a time difference, since the radio-controlled timepiece 1 can link to the mobile device 100 in response to short-range radio operation even in an airport building, and can acquire time information for displaying the local time from the mobile device 100, the radio wave correction timepiece 1 can be quickly corrected to the local time.

Second Embodiment

Figure 11:
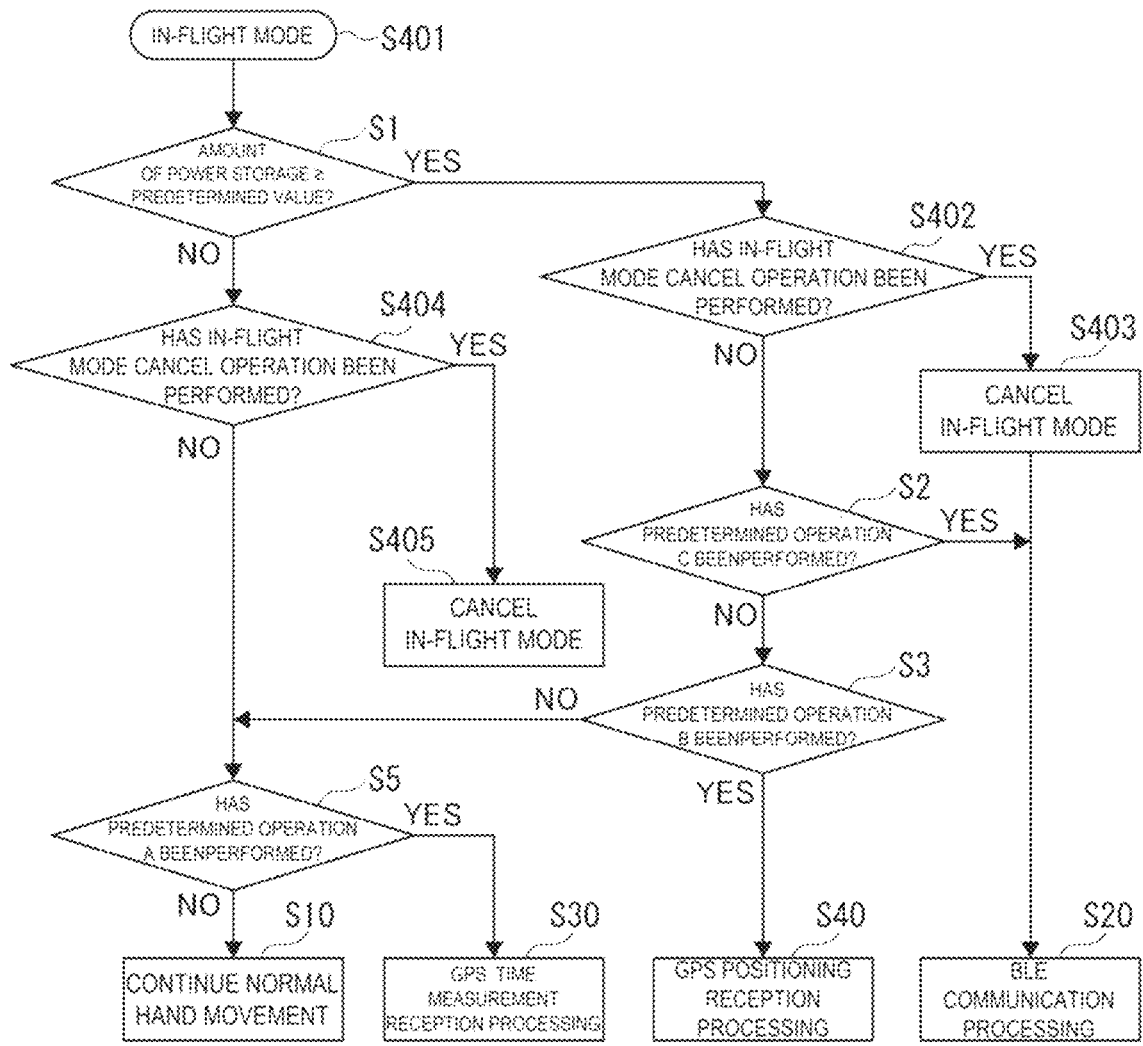
FIG. 11 is a flowchart illustrating operation of a radio-controlled timepiece of a second embodiment.

In the second embodiment, the process at the time of executing the in-flight mode differs from that in the first embodiment. That is, in the normal mode in which the in-flight mode is not executed, the same process of FIG. 7 as in the first embodiment is executed, and thus the description thereof will be omitted. On the other hand, when the in-flight mode is being executed, the in-flight mode process S401 illustrated in FIG. 11 is executed.

Hereinafter, the in-flight mode process S401, which differs from the first embodiment, will be described with reference to FIG. 11. Note that, in FIG. 11, the same reference signs are assigned to the same processes as the flowchart in FIG. 7, and the descriptions thereof will be omitted.

When the controller 61 of the radio-controlled timepiece 1 executes the in-flight mode and determines YES in step S1 for determining whether the amount of power storage is equal to or higher than the predetermined value, the controller 61 determines whether the in-flight mode cancel operation is performed (step S402).

The operation for shifting to the in-flight mode is, for example, an operation of pulling the crown 6 to the first stage and pressing the B button 7B for three seconds or longer. The operation to cancel the in-flight mode is the same operation.

When the user performs an operation for canceling the in-flight mode and the controller 61 determines YES in step S402, the controller 61 cancels the in-flight mode (step S403), and activates the short-range wireless communication controller 645 to execute the BLE communication processing (step S20).

When there is no operation to cancel the in-flight mode by the user and the controller 61 determines NO in step S402, the controller 61 executes the processes of step S2 and the subsequent steps. The respective processes of steps S2, S3, S5, S10, S30, and S40 are the same as those of the first embodiment illustrated in FIG. 7, and thus descriptions thereof will be omitted.

When the controller 61 determines NO in step S1, the controller 61 determines whether there is the in-flight mode cancel operation (step S404).

When the user performs the operation for canceling the in-flight mode and the controller 61 determines YES in step S404, the controller 61 cancels the in-flight mode (step S405). At this time, since NO is determined in step S1 and the amount of power storage of the secondary battery 24 is lower than the predetermined value, the BLE communication processing in step S20 is not executed, and the control returns to the normal mode.

Further, when the controller 61 determines NO in step S404, the controller 61 executes the processes of step S5 and the subsequent steps.

Note that, also in the mobile device 100, it is possible to set and cancel the communication prohibition mode in which communication with other devices is prohibited based on the operation by the second operating device provided in the mobile device 100.

Note that the second operating device is implemented by a button or the like which is displayed on the display 101 of the mobile device 100 and capable of touch input.

The mobile device 100 may be configured to automatically activate the application that executes BLE communication with the radio-controlled timepiece 1 for a certain period of time when the communication prohibition mode is canceled after setting the communication prohibition mode. Further, after canceling the communication prohibition mode, the user may perform operation of activating the application that executes BLE communication between the mobile device 100 and the radio-controlled timepiece 1.

Advantageous Effects of Second Embodiment

According to the second embodiment, when an airplane moves to an area having a different time zone, the BLE communication processing can be automatically started by canceling the in-flight mode. Thus, as compared with a case where the operation for canceling the in-flight mode, which is always performed when the airplane lands, and the operation for starting the BLE communication processing are performed separately, the time difference operation is simplified and the operability can be improved.

In addition, since the mobile device 100 such as a smartphone also cancels the communication prohibition mode when the airplane lands, the operability can be further improved by automatically starting the application of the mobile device 100 in conjunction with the operation of canceling the communication prohibition mode of the mobile device 100.

That is, the user can correct the time to the local time immediately after arriving at the airport by performing the operations of canceling the in-flight mode of the radio-controlled timepiece 1 and the mobile device 100 after the airplane has landed.

Other Exemplary Embodiments

Note that the present disclosure is not limited to the embodiments described above, and variations, modifications, and the like within the scope in which the object of the present disclosure can be achieved are included in the present disclosure.

For example, the time information transmitted from the mobile device 100 in the BLE communication processing is not limited to both UTC and the time difference information, and only the time difference information may be transmitted or the local time information may be transmitted. In short, the mobile device 100 may transmit information that can correct the display time of the radio-controlled timepiece 1 as the time information at the local time acquired by the mobile device 100.

Further, in each of the above-described embodiments, the RTC 66 measures UTC, but the RTC 66 may measure the local time that reflects the local time difference in UTC. In this case, when UTC and the time difference information is outputted from the receiver R1 or the short-range receiver R2, the controller 61 may update the RTC 66 at the local time that reflects the time difference information in UTC. Additionally, when the local time can be outputted from the receiver R1 or the short-range receiver R2, the RTC 66 may be updated with the outputted local time.

Further, in the above-described embodiment, as the automatic reception condition to be determined in step S4 in the normal mode, it is assumed that the automatic reception condition is satisfied when the preset scheduled reception time has come. But an optical reception condition for determining that the automatic reception condition is satisfied when the amount of light emitted to the solar cell panel 22 is equal to or higher than the threshold level may be added. In this case, when the time information cannot be acquired by the GPS time measurement reception processing at the scheduled reception time, the automatic reception may be executed under the optical reception condition, and the GPS time measurement reception processing may not be executed twice per day or more.

Further, when the time information has been acquired by executing the GPS time measurement reception processing the GPS positioning reception processing or the BLE communication processing by the predetermined operations A, B or C, respectively, it may be controlled so as not to execute the GPS time measurement reception processing for a predetermined time from the time of successful reception, for example, 12 hours or 24 hours, even when the automatic reception condition is satisfied.

That is, when the automatic reception condition is satisfied, the reception controller 640 may execute the first reception processing regardless of whether the reception processing by the predetermined operation is successful or not, or the reception controller 640 may control not to execute the first reception processing until the predetermined time elapses after the successful predetermined operation, and execute the first reception processing when the automatic reception condition is satisfied after the elapse of the predetermined time.

Further, in each of the embodiments described above, the automatic reception is not executed while the radio-controlled timepiece 1 is in in-flight mode, but in addition to the automatic reception, the manual reception may be prohibited. That is, even when any of the predetermined operations A to C is performed during the in-flight mode, the reception may not be performed.

In addition, in the second embodiment, although the application that executes BLE communication is automatically activated when the communication prohibition mode of the mobile device 100 is canceled, the application may be automatically activated by detecting that some operation has been performed, such as when the time zone of the mobile device 100 is manually corrected. In this case, it is possible to correct the internal time while reducing the number of operations in which the user executes the BLE communication processing on the radio-controlled timepiece 1 to activate the application.

Although the GPS satellite has been described as an example of the position information satellite S in the above-described embodiment, as the position information satellite S, each of the satellites using other global navigation satellite systems (GNSS) such as Galireo, GLONASS, and Beidou, a satellite-based augmentation system (SBAS), and a regional satellite positioning system (RNSS) that allows the quasi-zenith satellite and the like to search only in a specific area can also be applied.

Further, the short-range receiver is not limited to the one that receives the BLE radio wave, and may be one that receives other radio waves such as NFC.

In the embodiment described above, it has been described that the GPS positioning reception processing is performed to correct the time difference information, but the GPS positioning reception processing may not be performed and the time difference information may be automatically corrected only by the BLE communication processing.

Summary

A radio-controlled timepiece of the present disclosure includes a receiver configured to receive satellite radio waves including first time information, a short-range receiver configured to receive radio waves including second time information transmitted from a mobile device, an operating device configured to accept instruction operation, a reception controller configured to selectively execute first reception processing of acquiring the first time information by operating the receiver at a preset time and second reception processing of acquiring the second time information by operating the short-range radio receiver in response to the instruction operation from the operating device, and a time correction controller configured to correct a display time based on the first time information acquired in the first reception processing or the second time information acquired in the second reception processing.

The time correction automatically performed every day is executed by the receiver that receives the satellite radio waves as the first reception processing that is executed at the preset time. On the other hand, the second reception processing is executed by the short-range receiver when the user performs the instruction operation by the operating device.

For the radio wave reception processing by the short-range receiver, it is necessary to activate an application of the mobile device in advance. Thus, in order to perform the second reception processing for the purpose of daily time correction, the user needs to perform the startup operation of the application each time, which makes the operation complicated for the user. In addition, when the application of the mobile device is kept running, a part of the internal memory of the mobile device is occupied and the battery is also consumed.

According to the radio-controlled timepiece of the present disclosure, the daily scheduled reception is the first reception processing by the receiver, and the second reception processing by the short-range receiver is executed when the user gives an instruction operation, so that the number of operations to activate the application of the mobile device can be minimized, the operation becomes less complicated for the user, and the memory occupancy of the mobile device and the consumption of the battery can be suppressed.

In the radio-controlled timepiece of the present disclosure, the reception controller executes the second reception processing only in response to the instruction operation from the operating device.

Since the second reception processing is not executed even when the automatic reception condition is satisfied, the number of operations to activate the application of the mobile device can be minimized, the operation becomes less complicated for the user, and the memory occupancy of the mobile device and the consumption of the battery can be suppressed.

The radio-controlled timepiece of the present disclosure includes an optical sensor configured to detect whether an amount of emitted light is equal to or higher than a threshold level. When the optical sensor detects the amount of light equal to or higher than the threshold level, the reception controller causes the receiver to perform the first reception processing.

Since the reception controller operates the first reception processing not only when the preset time has come but also when the optical sensor detects the amount of light equal to or higher than the threshold level, the probability of success in the first reception processing for receiving the satellite radio waves can be improved.

In the radio-controlled timepiece of the present disclosure, the short-range receiver performs wireless communication with the mobile device by using BLUETOOTH® or NFC.

Since BLUETOOTH® or NFC is normally embedded in mobile devices such as smartphones, it is not necessary to prepare a special mobile device, and convenience can be improved.

The radio-controlled timepiece of the present disclosure includes a battery configured to store power, in which the reception controller is configured to execute the second reception processing when an amount of power storage of the battery is equal to or higher than a predetermined value, and does not execute the second reception processing when the amount of power storage of the battery is less than the predetermined value, and the reception controller is configured to execute the first reception processing when the amount of power storage of the battery is less than the predetermined value.

In the radio-controlled timepiece of the present disclosure, the reception controller has an automatic reception prohibition mode that is set by operation of the operating device and in which the first reception processing is not executed at the preset time, and the instruction operation from the operating device includes operation of canceling the automatic reception prohibition mode, and when the automatic reception prohibition mode is canceled by operation of the operating device, the reception controller executes the second reception processing.

When the reception prohibition mode is canceled by operation of the operating device of the radio-controlled timepiece, the reception controller starts the second reception processing Therefore, the convenience can be improved because the second reception processing is executed and the time can be updated to the local time only by performing the operation of canceling the automatic reception prohibition mode such as the in-flight mode after the airplane has landed.

A radio-controlled timepiece of the present disclosure includes a battery configured to store power, in which the reception controller has an automatic reception prohibition mode that is set by operation of the operating device and in which the first reception processing is not executed at the preset time, and the instruction operation from the operating device includes operation of canceling the automatic reception prohibition mode, and when the automatic reception prohibition mode is canceled by operation of the operating device and an amount of power storage of the battery is equal to or higher than a predetermined value, the reception controller executes the second reception processing.

A system of the present disclosure includes the radio-controlled timepiece and the mobile device, in which the mobile device includes a second operating device, is set, by operation of the second operating device, to a communication prohibition mode in which communication with another device is prohibited and starts a function of communicating with the radio-controlled timepiece when the communication prohibition mode is canceled by operation of the second operating device.

According to the system of the present disclosure, when the communication prohibition mode is canceled by operation of the second operating device of the mobile device, the function of communicating with the radio-controlled timepiece is started. Therefore, by simply canceling the communication prohibition mode of the mobile device after the airplane has landed, it is possible to shift to a state in which communication with the radio-controlled timepiece can be performed and it is not necessary to separately perform an execution operation of the communication function, so that convenience can be improved.

In the system of the present disclosure, the mobile device automatically activates an application for communication with the radio-controlled timepiece when the communication prohibition mode is canceled by operation of the second operating device.

A method for controlling a radio-controlled timepiece of the present disclosure is a control method for the radio-controlled timepiece including a receiver configured to receive satellite radio waves including first time information, a short-range receiver configured to receive radio waves including second time information transmitted from a mobile device, and an operating device configured to accept instruction operation. In the method, first reception processing by the receiver is executed at a preset time, second reception processing by the short-range receiver is executed in response to the instruction operation from the operating device, and a display time is corrected based on the first time information acquired in the first reception processing or the second time information acquired in the second reception processing.

According to the control method for the radio-controlled timepiece of the present disclosure, the daily scheduled reception is the first reception processing by the receiver, and the second reception processing by the short-range receiver is executed when the user gives an instruction operation, so that the number of operations to activate the application of the mobile device can be minimized, the operation becomes less complicated for the user, and the memory occupancy of the mobile device and the consumption of the battery can be suppressed.

What is claimed is:

1. A radio-controlled timepiece comprising:
a battery configured to store power;
a receiver configured to receive a satellite radio wave including first time information;
a short-range receiver configured to receive a radio wave including second time information transmitted from a mobile device;
an operating device configured to accept an instruction operation;
a reception controller configured to selectively execute a first reception processing of acquiring the first time information by operating the receiver at a preset time and a second reception processing of acquiring the second time information by operating the short-range radio receiver in response to the instruction operation from the operating device; and
a time correction controller configured to correct a display time based on the first time information acquired in the first reception processing or the second time information acquired in the second reception processing,
wherein the reception controller has an automatic reception prohibition mode that is set by an operation of the operating device and in which the first reception processing is not executed at the preset time,
the instruction operation from the operating device includes an operation of canceling the automatic reception prohibition mode, and
when the automatic reception prohibition mode is canceled by the operation of the operating device and an amount of power storage of the battery is equal to or higher than a predetermined value, the reception controller is configured to execute the second reception processing.

2. The radio-controlled timepiece according to claim 1, wherein the reception controller executes the second reception processing only in response to the instruction operation from the operating device.

3. The radio-controlled timepiece according to claim 1, the radio-controlled timepiece comprising:
an optical sensor configured to detect whether an amount of emitted light is equal to or higher than a threshold level, wherein
when the optical sensor detects an amount of light equal to or higher than the threshold level, the reception controller causes the receiver to perform the first reception processing.

4. The radio-controlled timepiece according to claim 1, wherein the short-range receiver performs wireless communication with the mobile device by using a near-range wireless communication or a near field communication.

5. The radio-controlled timepiece according to claim 1, wherein the reception controller is configured to not execute the second reception processing when the amount of power storage of the battery is less than the predetermined value, and
the reception controller is configured to execute the first reception processing when the amount of power storage of the battery is less than the predetermined value.

6. A system comprising:
a receiver configured to receive a satellite radio wave including first time information;
a short-range receiver configured to receive a radio wave including second time information transmitted from a mobile device;
an operating device configured to accept an instruction operation;
a reception controller configured to selectively execute a first reception processing of acquiring the first time information by operating the receiver at a preset time and a second reception processing of acquiring the second time information by operating the short-range radio receiver in response to the instruction operation from the operating device;
a time correction controller configured to correct a display time based on the first time information acquired in the first reception processing or the second time information acquired in the second reception processing; and
the mobile device, wherein
the mobile device includes a second operating device,
the mobile device is set, by an operation of the second operating device, to a communication prohibition mode in which a communication with another device is prohibited,
the mobile device starts a function of communicating with the radio-controlled timepiece when the communication prohibition mode is canceled by the operation of the second operating device, and
the mobile device automatically activates an application for communicating with the radio-controlled timepiece when the communication prohibition mode is canceled by the operation of the second operating device.

7. The system according to claim 6, further comprising:
a battery configured to store power,
wherein the reception controller has an automatic reception prohibition mode that is set by an operation of the operating device and in which the first reception processing is not executed at the preset time,
the instruction operation from the operating device includes an operation of canceling the automatic reception prohibition mode, and
when the automatic reception prohibition mode is canceled by the operation of the operating device and an amount of power storage of the battery is equal to or higher than a predetermined value, the reception controller executes the second reception processing.

8. A method for controlling a radio-controlled timepiece, the radio-controlled timepiece including
a battery configured to store power,
a receiver configured to receive satellite radio waves including first time information,
a short-range receiver configured to receive radio waves including second time information transmitted from a mobile device, and
an operating device configured to accept an instruction operation, the method comprising:
executing a first reception processing by the receiver at a preset time;
executing a second reception processing by the short-range receiver in response to the instruction operation from the operating device;
correcting a display time based on the first time information acquired in the first reception processing or the second time information acquired in the second reception processing; and
setting an automatic reception prohibition mode by an operation of the operating device and in which the first reception processing is not executed at the preset time,
wherein the instruction operation from the operating device includes an operation of canceling the automatic reception prohibition mode, and
when the automatic reception prohibition mode is canceled by the operation of the operating device and an amount of power storage of the battery is equal to or higher than a predetermined value, the reception controller is configured to execute the second reception processing.

* * * * *